(12) United States Patent
Murata et al.

(10) Patent No.: US 7,367,791 B2
(45) Date of Patent: May 6, 2008

(54) DEVICE FOR PRODUCING ANNULAR OR ARCUATE MAGNET

(75) Inventors: Tetsu Murata, Toyota (JP); Ryoji Makino, Toyota (JP); Yuji Takemoto, Toyota (JP); Katsuyuki Hiraiwa, Toyota (JP); Shinji Kawamura, Toyota (JP); Takahiro Nishiyama, Toyota (JP); Yoshinobu Honkura, Tokai (JP); Hironari Mitarai, Tokai (JP); Kenji Noguchi, Tokai (JP)

(73) Assignee: Aichi Steel Corporation, Tokai-shi (JP)

( * ) Notice: Subject to any disclaimer, the term of this patent is extended or adjusted under 35 U.S.C. 154(b) by 236 days.

(21) Appl. No.: 10/991,455

(22) Filed: Nov. 19, 2004

(65) Prior Publication Data

US 2006/0110484 A1    May 25, 2006

(51) Int. Cl.
  B29C 43/14    (2006.01)
(52) U.S. Cl. .......................... 425/3; 425/78; 425/353; 425/404; 425/412; 425/466
(58) Field of Classification Search .................. 425/3, 425/78, 352–355, 404, 412, 388, 467–468, 425/DIG. 33, DIG. 115
See application file for complete search history.

(56) References Cited

U.S. PATENT DOCUMENTS

| 5,672,363 A |   | 9/1997 | Sagawa et al. |
| 5,886,070 A | * | 3/1999 | Honkura et al. ............ 264/108 |
| 5,906,837 A | * | 5/1999 | Link et al. ..................... 425/78 |

FOREIGN PATENT DOCUMENTS

| EP | 0 265 016 A2 | 4/1988 |
| JP | 8-130143 | 5/1996 |
| JP | 10-022153 | 1/1998 |
| JP | 11-176682 | 7/1999 |
| JP | 2003-203818 | 7/2003 |

* cited by examiner

Primary Examiner—Yogendra N. Gupta
Assistant Examiner—Thu Khanh T. Nguyen
(74) Attorney, Agent, or Firm—Westerman, Hattori, Daniels & Adrian, LLP.

(57) ABSTRACT

A device capable of producing an annular magnet or arcuate magnet with excellent dimensional accuracy and magnet performance, of which the mass is not greatly scattered. The device for producing the annular magnet, for example, includes a preforming section for obtaining an annular preformed body from a compound of a mixture of an anisotropic magnet powder and a thermosetting resin, a magnetic field orienting and forming section for obtaining an annular intermediate formed body by subjecting the annular preformed body to orienting and pressure-forming, a main forming section for obtaining an annular magnet by further forming the annular intermediate formed body, and a work transferring section for transferring works. The preforming section is provided with mass measuring means for measuring the mass of the annular preformed body, and a first lower punch of the preforming section is so arranged as to vary the volume of an annular cavity by varying the position thereof, which is before the pressure-forming process with a servomotor based on the mass of preformed body, which has been measured with the mass measuring means.

11 Claims, 29 Drawing Sheets

DEVICE FOR PRODUCING ANNULAR OR ARCUATE MAGNET

BACKGROUND OF THE INVENTION

1. Field of the Invention

The present invention relates to a device for producing an annular or arcuate magnet, by which an annular or arcuate preformed body is formed from a compound containing anisotropic magnet powder, the magnetic field of the preformed body is oriented, and pressure is applied thereto.

2. Description of Related Art

There has been employed a method of forming a compound obtained by mixing the anisotropic magnet powder and a thermosetting resin to produce a magnetically anisotropic resin bonded magnet. With the process disclosed in Japanese Patent No. 2816668, for example, the above-described compound is charged in a preforming mold which has been heated, a magnetic field is applied to the compound to orient anisotropic magnet powder in a prescribed direction, thereby orienting the magnetic field thereof, and at the same time, pressure is applied to the compound to form a preformed body. Then, the preformed body is placed in a main forming mold that has been heated, and a pressure larger than that upon preforming is further applied to the preformed body for compression thereof, thereby forming the above-described magnet.

As described above, by forming a preformed body previously, and then compressing the preformed body with a larger pressing force, a magnet with excellent dimensional accuracy can be produced.

However, further improvement of the dimensional accuracy of the above-described magnet, and reduction of the scattering in mass thereof greatly depend on the charging amount of the compound in the preforming mold. And, in particular, where an annular magnet with an annular configuration or an arcuate magnet with an arcuate configuration is produced, a cavity in the preforming mold, which is adapted to charge the above-described compound, becomes narrow to make the uniform charging of this compound difficult.

Consequently, upon producing the annular magnet or arcuate magnet with the process of Japanese Patent No. 2816668, the mass along with the magnet performance thereof may scatter.

SUMMARY OF THE INVENTION

The present invention has been made considering these problems of the conventional process, and has an object of providing a device for continuously producing an annular or arcuate magnet which is excellent in dimensional accuracy and magnet performance and free from a great scattering in mass.

According to a first aspect of the present invention, there is provided a device for producing an annular magnet or an arcuate magnet, which has a preforming section including a first die which defines an outer peripheral part of an annular cavity or a plurality of arcuate cavities, each facing each other, a first core which defines an inner peripheral part of the annular cavity or the plurality of arcuate cavities, a first lower punch which defines a bottom of the annular cavity or the plurality of arcuate cavities, and a first upper punch which faces the first lower punch, and in which the annular cavity or the plurality of arcuate cavities is charged with a compound as a mixture of an anisotropic magnet powder and a thermosetting resin, the compound is pressure-formed in the annular cavity or the plurality of arcuate cavities with the first upper punch and the first lower punch, thereby obtaining a preformed body;

a magnetic field orienting and forming section for obtaining an intermediate formed body, including a second die for holding an outer peripheral surface of the preformed body, a second core for holding an inner peripheral surface of the preformed body, a second lower punch for holding a bottom of the preformed body, a second upper punch for facing the second lower punch, magnetic field applying means for applying a magnetic field to the preformed body, and heating means for heating the preformed body, a main forming section for obtaining an annular magnet or a plurality of arcuate magnets, including a third die for holding an outer peripheral surface of the intermediate formed body, a third core for holding an inner peripheral surface of the intermediate formed body, a third lower punch for holding a bottom of the intermediate formed body, a third upper punch for facing the third lower punch, and heating means for heating the intermediate formed body, and a work transferring section which holds the preformed body, and transfers the preformed body from the preforming section to the magnetic field orienting and forming section, and which also holds the intermediate formed body, and transfers the intermediate formed body from the magnetic field orienting and forming section to the main forming section, the first through third upper punches, the first through third lower punches and the first through third cores are so arranged as to be respectively driven with servomotors, and the preforming section further includes mass measuring means for measuring the mass of the preformed body after forming of the preformed body, and the first lower punch is so arranged as to vary the position thereof before pressure-forming with the servomotor, based on the mass of the preformed body, which has been measured with the mass measuring means, thereby varying a volume of one of the cavity and the cavities.

With the device of the present invention, upon producing the annular magnet or a plurality of arcuate magnets from the compound, the annular magnet or a plurality of arcuate magnets is produced by the device composed of three sections, that is the preforming section for forming the preformed body with an annular shape or arcuate shape from the compound, the magnetic field orienting and forming section for carrying out orienting of the magnetic field of the preformed body, thereby forming the intermediate formed body, and the main forming section for forming the annular magnet or a plurality of arcuate magnets from the intermediate formed body.

And in the device of the present invention, the mass of all the preformed bodies which have been formed in the preforming section can be measured with the mass measuring means, and by varying the volume of the cavity in the preforming section based on the measured mass, the scattering in mass of the preformed body can be reduced.

Upon producing the annular magnet or a plurality of arcuate magnets from the compound, first, in the preforming section, the cavity defined by the first die, first core and first lower punch is charged with a compound as a mixture of an anisotropic magnet powder and a thermosetting resin. Then, by moving the first upper punch to compress (pressure-forming) the compound in the cavity with the first upper punch and the first lower punch, the preformed body is obtained.

And with the present invention, by means of the mass measuring means, the mass of all the preformed bodies formed in the preforming section can be measured. Accordingly, the generation of scattering in mass of the preformed body can be watched. And if an error in charging amount of the compound in the cavity occurs in the preforming section, for example, it can be speedily detected by watching the mass with the mass measuring means.

Accordingly, only when the mass of the preformed body is within the range of mass values of good products, the preformed body can be transferred to the following magnetic field orienting and forming section with the work transferring section. On the other hand, when the measured mass of the preformed body is out of the range of mass values of good products, transfer of the preformed body to the following magnetic field orienting and forming section can be stopped.

With this arrangement, only the preformed bodies which have been judged good with the mass measuring means are carried in the magnetic field orienting and forming section. Therefore, the scattering in mass of the preformed body to be carried in the magnetic field orienting and forming section can be reduced.

In addition, the preformed body that has been judged inferior can be reused as a compound after crushing in an outside or the like of the device. Therefore, the compound is scarcely wasted, and accordingly the yield in the device can be improved.

In addition, with the present invention, in the preforming section, the first lower punch is arranged such that the position thereof, which is before pressure-forming, can be varied based on the mass of the preformed body, which has been measured with the mass measuring means. Accordingly, when the mass measuring means continuously or frequently judge the preformed body inferior, for example, the position of the first lower punch, which is before pressure-forming, can be varied with the servomotors.

More specifically, when the preformed bodies of which masses exceed the range of mass values of good products are continuously or frequently formed, it is considered that the volume of the cavity in the preforming section is great, and in this case, by varying the position of the first lower punch, the volume of the cavity can be reduced. On the other hand, when the preformed bodies of which masses are less than the range of mass values of good products are continuously or frequently formed, it is considered that the volume of the cavity in the preforming section is small, and in this case, by varying the position of the first lower punch, the volume of the cavity can be increased.

And consequently, by varying the volume of the cavity arbitrarily, the masses of the preformed body to be transferred to the magnetic field orienting and forming section can be adjusted, thereby further reducing the scattering in the mass of the preformed body.

Then, the preformed bodies which have been judged good with the mass measuring means are transferred to the magnetic field orienting and forming section with the work transferring section.

And in the magnetic field orienting and forming section, the preformed bodies which have been judged good are held with the second die, second core and second lower punch. And by moving the second upper punch, the preformed bodies are further compressed (pressure-forming) between the second upper punch and the second lower punch. Upon compressing, the preformed bodies are heated with the heating means to melt the thermosetting resin in the preformed body, thereby producing the state where the anisotropic magnet powder in the preformed body can be turned and moved.

In addition, upon compressing, a magnetic field is applied to the preformed body in which the thermosetting resin is melted with the magnetic field applying means. To this effect, in the magnetic field orienting and forming section, the anisotropic magnet powder is turned and moved in the thermosetting resin to orient the anisotropic magnet powder in a specific direction, and the preformed body is further compressed to an intermediate formed body. Hereinafter, the magnetic field orienting and pressure-forming in the magnetic field orienting and forming section will be also referred to as "magnetic field orienting and forming".

Thus, in the magnetic field orienting and forming section, the intermediate formed body can be formed from the preformed body of which the mass does not greatly scatter, and of which the anisotropic magnet powder content does not greatly scatter. Accordingly, in the magnetic field orienting and forming section, the intermediate formed body can be formed without a great scattering in the anisotropic magnet powder content.

Therefore, when the intermediate formed body is formed in the main forming section, and an obtained annular magnet or arcuate magnets are magnetized to N and S poles, scattering in the magnet performance of the annular magnet or a plurality of arcuate magnets can be reduced.

Next, the intermediate formed body formed in the magnetic field orienting and forming section is transferred to the main forming section with the work transferring section.

And, in the main forming section, the intermediate formed body is held with the third die, third core and third lower punch. And, by moving the third upper punch, the intermediate formed body is further compressed (pressure-forming) between the third upper punch and the third lower punch. Upon compressing, the intermediate formed body is heated with the heating means to melt the thermosetting resin in the intermediate formed body. Hereinafter, the pressure-forming performed in this main forming section will be also referred to as "main forming".

In the main forming section, the thermosetting resin in the intermediate formed body is not required to be completely melted. It may be in a half-melted state where the thermosetting resin is melted to some extent.

And in the main forming section, the heating temperature of the heating means may be made higher than that in the magnetic field orienting and forming section, and the pressure force of the third upper punch may be made greater than that of the second upper punch. Consequently, the intermediate body can be further compressed, whereby an annular magnet or a plurality of arcuate magnets with excellent dimensional accuracy can be formed.

And, the position, pressing rate, pressing force or the like of each of the upper punches, lower punches and cores in the performing section, magnetic field orienting and forming section and main forming section can be adjusted with servomotors. Therefore, by controlling the servomotors, the positions of each of the upper punches, lower punches and cores can be adjusted finely, and the pressing rate, pressing force or the like of each of the upper punches, lower punches and cores can be adjusted finely. Consequently, the forming conditions in the performing section, magnetic field orienting and forming section, and the main forming section can be made most appropriate, whereby the dimensional accuracy of the annular magnet or a plurality of arcuate magnets can be further improved.

And, with the present invention, the preformed body formed in the preforming section can be transferred to the magnetic field orienting and forming section with the work transferring section, and the intermediate formed body formed in the magnetic field orienting and forming section can be transferred to the main forming section. Therefore, the device of the present invention can produce the annular magnet or a plurality of arcuate magnets from the compound continuously.

And, with the present invention, when the intermediate formed body is formed in the magnetic field orienting and forming section for example, another preformed body can be formed in the preforming section. And, when the annular magnet or a plurality of arcuate magnets is formed in the main forming section, another preformed body and another intermediate formed body can be formed in the preforming section and the magnetic field orienting and forming section.

Accordingly, in each section of the preforming section, the magnetic field orienting and forming section and the main forming section, forming operations can be performed at the same time and continuously. And with the work transferring section, transferring can be performed using the period of time when forming is performed in each of the sections. Consequently, the number of the annular magnet or a plurality of arcuate magnets, which have been produced per unit time can be increased, whereby the productivity of the annular magnet or a plurality of arcuate magnets can be improved.

In addition, each section of the preforming section, the magnetic field orienting and forming section and the main forming section is composed of a motor-operated servo type press using the servomotors. Therefore, each section can be made compact, as compared with the case of the conventional electric crank type press or hydraulic press, whereby the device of the present invention can be arranged compact, although three sections are included.

Accordingly, as described above, with the device of the present invention, the annular magnet or a plurality of arcuate magnets of which the masses do not greatly scatter, and which exhibit excellent magnet performance can be produced continuously and efficiently.

According to a second aspect of the present invention, there is provided a device for producing one of an annular magnet and an arcuate magnet, which includes a preforming section having a first die for defining an outer peripheral part of one of an annular cavity and a plurality of arcuate cavities, each facing each other, a first core for defining an inner peripheral part of one of said annular cavity and said plurality of arcuate cavities, a first lower punch for defining a bottom of one of the annular cavity and the plurality of arcuate cavities, and a first upper punch for facing said first lower punch, and in which one of the annular cavity and the plurality of arcuate cavities is charged with a compound as a mixture of an anisotropic magnet powder and a thermosetting resin, the compound is pressure-formed in one of the annular cavity and the plurality of arcuate cavities with the first upper punch and the first lower punch, thereby obtaining a preformed body;

a magnetic field orienting and forming section for obtaining one of an annular magnet and a plurality of arcuate magnets, the magnetic field orienting and forming section having a second die for holding an outer peripheral surface of the preformed body, a second core for holding an inner peripheral surface of the preformed body, a second lower punch for holding a bottom of the preformed body, a second upper punch facing the second lower punch, magnetic field applying means for applying a magnetic field to the preformed body, and heating means for heating the preformed body, and a work transferring section for holding the preformed body, and transferring the preformed body from the preforming section to the magnetic field orienting and forming section.

The first and second upper punches, the first and second lower punches and the first and second cores are so arranged as to be respectively driven with servomotors.

The preforming section further has mass measuring means for measuring the mass of the preformed body after forming of the preformed body, and the first lower punch is so arranged as to vary the position thereof before pressure-forming with the servomotor, based on the mass of the preformed body, which has been measured with the mass measuring means, thereby varying the volume of one of the cavity and the cavities.

With this device, by carrying out the pressure molding performed in the main forming section with the first aspect of the invention, in the magnetic field orienting and forming section, the third upper punch, the third lower punch, the third core and the heating means can be omitted whereby the costs of the device for producing an annular magnet or an arcuate magnet can be decreased, and the construction thereof can be made compact.

With the second aspect of the present invention, the annular magnet or a plurality of arcuate magnets can be obtained by subjecting the preformed body to pressure-forming directly in the magnetic field orienting and forming section. The remaining constructions and operational advantages of the second aspect of the present invention are identical to those of the first aspect of the present invention.

In the first and second aspects of the present invention, alnico, ferrite, rare earth cobalt, rare earth iron or the like can be used as the anisotropic magnet powder. And it is more preferable to use Nd—Fe—B base, Sm—Co base or the like base well-known rare earth magnet powder as the anisotropic magnet powder.

And a phenol resin, epoxy resin, polyester resin, or the like can be used as the thermosetting resin.

And the annular magnet and a plurality of arcuate magnets can be used as magnets for various kinds of motors. In particular, the annular magnet can be used by disposing it in a stator of a DC motor, and a plurality of arcuate magnets can be used by disposing them in a stator of a DC motor so as to face each other.

And, in the first aspect of the present invention, it is preferable that the work transferring section has a cassette for the magnetic field orienting and forming section, which carries the preformed body in the magnetic field orienting and forming section, and carries the intermediate formed body out of the magnetic field orienting and forming section, a cassette for the main forming section, which carries the intermediate formed body in the main forming section, and carries one of the annular magnet and a plurality of arcuate magnets out of the main forming section, and a loader cassette which receives the intermediate formed body from the cassette for the magnetic field orienting and forming section, and delivers it to the cassette for the main forming section.

In this case, carrying-in of the preformed body and carrying-out of the intermediate formed body in the magnetic field orienting and forming section, and carrying-in of the intermediate formed body and carrying-out of the annular magnet (a plurality of arcuate magnets) in the main forming section can be respectively performed with the cassette for the magnetic field orienting and forming section and the cassette for the main forming section in parallel. And, the carrying-in and out with each cassette, and the receiving and delivering with the loader cassette can be performed using the period of time when each section carries out forming thereof.

Therefore, carrying-in and out and receiving and delivering of works such as each formed body or annular magnet (a plurality of arcuate magnets) thereof can be performed with a shortened period of time, whereby the number of annular magnet or a plurality of arcuate magnets produced per unit period of time can be further increased.

And, the work transferring section can have a cassette for the preforming section, which is adapted to carry the preformed body out of the preforming section. In this case, the cassette for the preforming section can be moved at the same time with the cassette for the magnetic field orienting and forming section and the cassette for the main forming section.

And, it is preferable that the cassette for the magnetic field orienting and forming section is arranged to hold the preformed body which is prior to magnetic field orienting and forming, advance to the position between the second upper punch and the second lower punch, supply the preformed body to the second upper punch, receive the intermediate formed body which is after magnetic field orienting and forming, hold the intermediate formed body, and move back from the position between the second upper punch and the second lower punch.

In this case, when the cassette for the magnetic field orienting and forming section advances to the position between the second upper punch and the second lower punch, it can receive the intermediate formed body which is after magnetic field orienting and forming from the second lower punch, and supply the preformed body to the second upper punch. Therefore, supplying of the preformed body to the second upper punch and the delivering of the intermediate formed body from the second lower punch can be performed in a short period of time, whereby the period of time required for carrying-in and out in the magnetic field orienting and forming section can be further shortened.

The magnetic field orienting and forming means that in the magnetic field orienting and forming section, both magnetic field orienting and pressure-forming are performed.

And, it is preferable that the cassette for the magnetic field orienting and forming section is arranged to receive the intermediate formed body when the second lower punch pushes the intermediate formed body to the cassette for the magnetic field orienting and forming section, and supply the preformed body to the second upper punch when the preformed body is pushed out with the intermediate formed body.

In this case, delivering of the intermediate formed body to the cassette for the magnetic field orienting and forming section, receiving of the preformed body from the cassette for the magnetic field orienting and forming section, and supplying of the preformed body to the second upper punch can be performed using the moving action of the second lower punch. Namely, with the moving action of the second lower punch, the intermediate formed body held by the second lower punch can be pushed out to the cassette for the magnetic field orienting and forming section and then delivered therefrom, and at approximately the same time, the preformed body can be pushed out from the cassette for the magnetic field orienting and forming section to the second upper punch, and supplied thereto.

Therefore, special devices or the like are not required to deliver, unload and supply each of the formed bodies, and delivering, unloading and supplying can be performed with a simple arrangement of the cassette for the magnetic field orienting and forming section. In addition, delivering, unloading and supplying can be performed at approximately the same time, and accordingly, the period of time required for performing carrying-in and carrying-out in magnetic field orienting and forming section can be further shortened.

The cassette for the magnetic field orienting and forming section in the first aspect of the present invention can be applied to the second aspect of the present invention, and similar operational advantages to those with the first aspect of the present invention can be also effected with the second aspect of the present invention.

And, it is preferable that the cassette for the main forming section is arranged to hold the intermediate formed body which is to be subjected to the next main forming process, advance to the position between the third upper punch and the third lower punch, supply the intermediate formed body to the third upper punch, receive the annular magnet or plurality of arcuate magnets, which has been subjected to the preceding main forming process, and move back from the position between the third upper punch and the third lower punch while holding the annular magnet or plurality of arcuate magnets.

In this case, delivering of the annular magnets or a plurality of arcuate magnets to the cassette for the main forming section, unloading of the intermediate formed body from the cassette for the main forming section, and supplying of this intermediate formed body to the third upper punch can be performed using the moving action of the third lower punch. Namely, with the moving action of the third lower punch, the annular magnets or a plurality of arcuate magnets retained by the third lower punch can be pushed out to the cassette for the main forming section, and delivered therefrom. At approximately the same time, the intermediate formed body can be pushed out and fed from the cassette for the main forming section to the third upper punch.

Therefore, special devices or the like are not required to deliver, unload and supply each of the formed bodies, and delivering, unloading and supplying can be performed with a simple arrangement of the cassette for the main forming section. In addition, delivering, unloading and supplying can be performed at the same time, and accordingly, the period of time required for performing carrying-in and carrying-out in the main forming section can be further shortened.

The "main forming" means the pressure-forming in the main forming section.

And, it is preferable that the cassette for the main forming section is arranged to receive one of the annular magnet and a plurality of arcuate magnets when the third lower punch pushes one of the annular magnet and a plurality of arcuate magnets forming section to the main forming section, and supply the intermediate formed body to the third upper punch when the intermediate formed body is pushed out with one of the annular magnet and plurality of arcuate magnets.

In this case, delivering of the annular magnets or a plurality of arcuate magnets to the cassette for the main forming section, unloading of the intermediate formed body from the cassette for the main forming section, and supplying of this intermediate formed body to the third upper punch can be performed using the moving action of the third lower punch. Namely, with the moving action of the third lower punch, the annular magnets or a plurality of arcuate magnets retained by the third lower punch can be pushed out to the cassette for the main forming section, and delivered therefrom. At the same time, the intermediate formed body can be pushed out and supplied from the cassette for the main forming section to the third upper punch.

Therefore, special devices or the like are not required to deliver, unload and supply each of the formed bodies, and delivering, unloading and supplying can be performed with a simple arrangement of the cassette for the main forming section. In addition, delivering, unloading and supplying can be performed at approximately the same time, and accordingly, the period of time required for performing carrying-in and carrying-out in the main forming section can be further shortened.

And, in the first aspect of the present invention, it is preferable that the device for producing one of an annular magnet and an arcuate magnet is arranged such that the magnetic field orienting and forming section and the main forming section perform pressure-forming at different timings to restrain the generation of the peak electric power in the device.

In this case, the generation timing of the electric power required when forming is performed in the magnetic field orienting and forming section by operating each servomotor, and that of the electric power required when forming is performed in the main forming section by operating each servomotor can be made different from each other. With this arrangement, the generation timing of a great electric power can be dispersed, and accordingly a peak power as a maximum output power of the device can be decreased. Therefore, a maximum power feeding capacity required for this device can be decreased, although the three sections are included.

And it is preferable that the main forming section is so arranged as to carry out pressure-forming of intermediate formed bodies which are stacked (piled up) with the third upper punch and said third lower punch.

In this case, even when the thickness (height in an axial direction) of the intermediate formed body cannot be increased due to the limitation of the magnetic field applying means in the magnetic field orienting and forming section, an annular magnet or a plurality of arcuate magnets with a required thickness (height in an axial direction) can be obtained by joining intermediate formed bodies in an axial direction thereof with pressure-forming in the main forming section in a piled state.

And it is preferable that the work transferring section of the first and second aspects of the present invention is arranged to have preheating means capable of preheating the preformed body upon holding the preformed body.

In this case, when the preformed body is transferred from the performing section to the magnetic field orienting and forming section, it can be previously heated, whereby magnetic field orienting and pressure-forming can be speedily started in the magnetic field orienting and forming section.

And, it is preferable that the device for producing an annular magnet or arcuate magnet has a lubricant oil impregnating section for impregnation of the preformed body with a lubricant oil, and the lubricant oil impregnating section has an impregnation jig for disposing the preformed body, lubricant oil feeding means for feeding the lubricant oil to the preformed body placed in the impregnation jig, and suction means for sucking the lubricant oil impregnated in the preformed body placed in the impregnation jig, and the work transferring section is so arranged as to hold the preformed body which is before impregnating with the lubricant oil, and transfer the preformed body from the performing section to the lubricant oil impregnating section, while holding the preformed body which is after impregnating with the lubricant oil, and transfer the performed body from the lubricant oil impregnating section to the magnetic field orienting and forming section.

In this case, in the lubricant oil impregnating section, the preformed body is impregnated with a lubricant oil, and accordingly the friction resistance of the preformed body can be reduced.

And, when the preformed body impregnated with the lubricant oil is transferred to the magnetic field orienting and forming section, the generation of wear can be restrained when the second die, second upper punch, second lower punch, second core or the like in the magnetic field orienting and forming section rubs the preformed body or the intermediate formed body after forming. And, with the first aspect of the present invention, by virtue of the lubricant oil, generation of wear can be restrained when the third die, third upper punch, third lower punch, third core or the like rub the intermediate formed body or the annular magnet (a plurality of arcuate magnets) in the main forming section.

And, upon performing the magnetic field orienting and forming in the magnetic field orienting and forming section, the orientation of the magnetic field can be also performed more speedily, because of the impregnation of the lubricant oil in the preformed body. Namely, upon melting the thermosetting resin included in the preformed body in the magnetic field orienting and forming section, the anisotropic magnet powder can be oriented in a specific direction more speedily by virtue of the lubricant oil. Therefore, when the annular magnet or a plurality of arcuate magnets are produced and magnetized, the magnet performance thereof can be further improved.

And, in the lubricant oil impregnating section, by means of the lubricant oil feeding means, the lubricant oil is fed to the preformed body disposed in the impregnation jig for impregnation, and by means of the suction means, an excess amount of lubricant oil can be sucked from the preformed body. Therefore, the preformed body can be impregnated with the lubricant oil approximately homogeneously.

And, by adjusting the suction period of time with the suction means, the impregnation amount of the lubricant oil in the preformed body can be readily controlled. Therefore, the impregnation amount of the lubricant oil can be made a necessary and sufficient amount so that the lubricant oil included in the preformed body in an excess amount can be prevented from contaminating the magnetic field orienting and forming section and the main forming section.

And, the work transferring section serves to transfer the preformed body from the preforming section to the lubricant oil impregnating section, and from the lubricant oil impregnating section to the magnetic field orienting and forming section, and consequently, the device of the present invention can produce the annular magnet or a plurality of arcuate magnets from the compound while impregnating with lubricant oil in series.

Ethylene glycol-based lubricant oil, for example, can be used as the lubricant oil.

EMBODIMENT

Hereinafter, an embodiment of the device for producing an annular magnet in accordance with the present invention will be explained with reference to the drawings.

Embodiment 1

Figure 1:
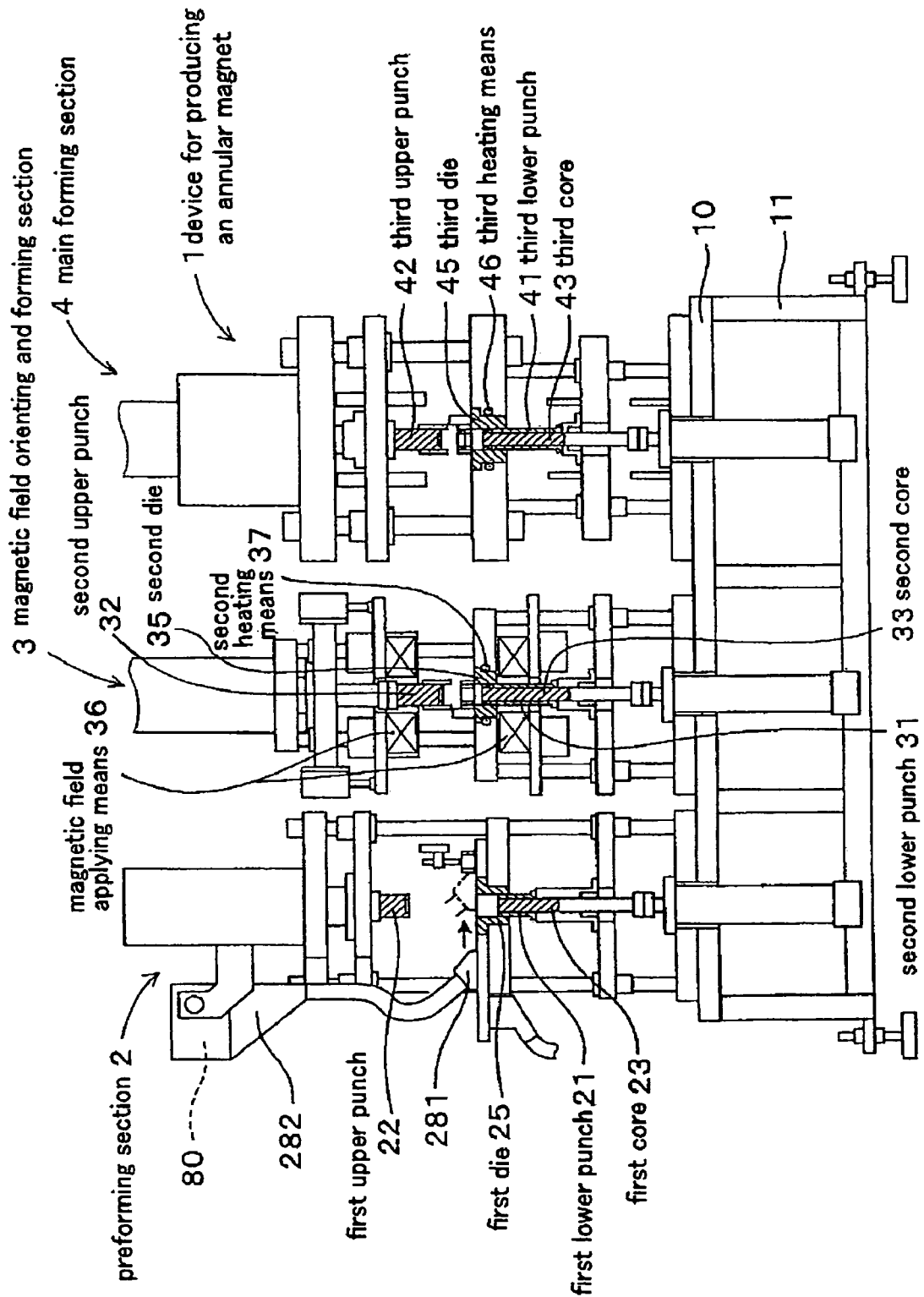
FIG. 1 is a diagram showing an embodiment 1 of a device for producing an annular magnet, which is seen from a front thereof.
Figure 2:
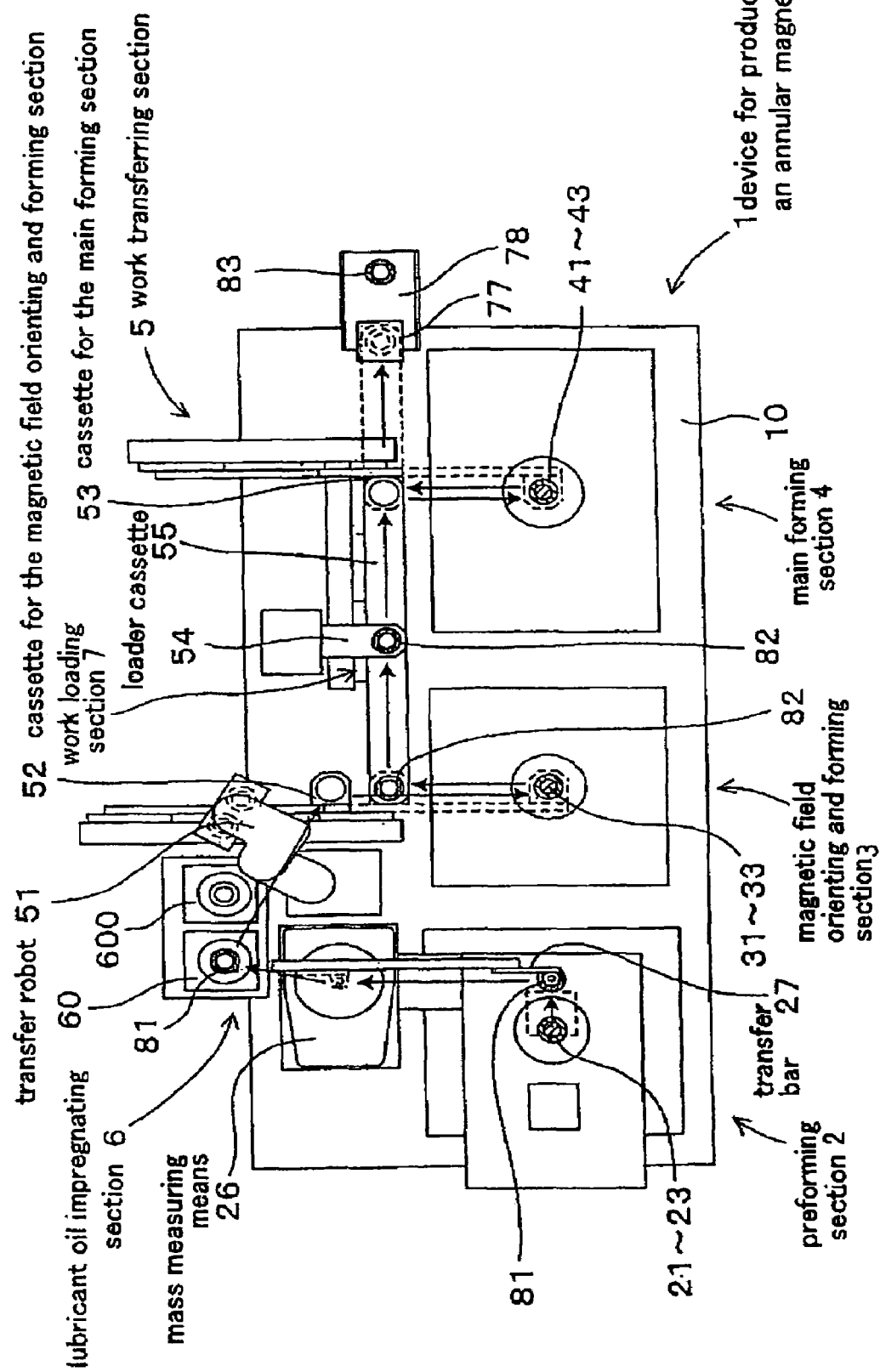
FIG. 2 is a plan view showing an embodiment 1 of a device for producing an annular magnet.

As shown in FIGS. 1 and 2, a device 1 for producing an annular magnet of the present embodiment is the device by which an annular magnet 83 is produced from a compound 80 containing anisotropic magnet powder with three sections including a later-describing preforming section 2, a magnetic field orienting and forming section 3 and a main forming section 4.

Figure 6:
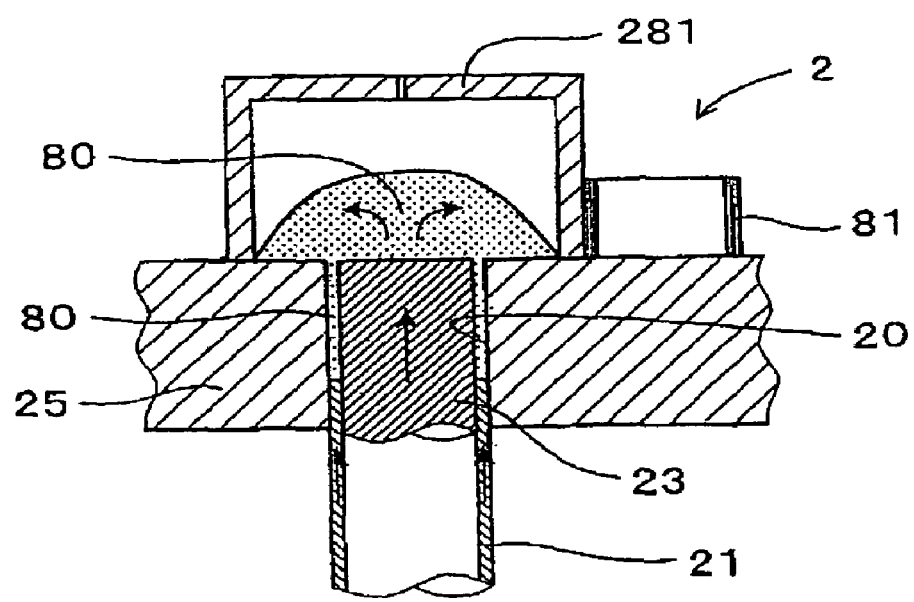
FIG. 6 is a diagram showing the state where a charging space of the preforming section is charged with a compound, and an excess compound is discharged.

More specifically, as shown in FIGS. 1 and 6, the preforming section 2 has a first die 25 defining an outer peripheral wall of an annular cavity 20, a first core 23 defining an inner peripheral wall of the annular cavity 20, a first lower punch 21 defining a bottom wall of the annular cavity 20, and a first upper punch 22 facing the first lower punch 21.

Figure 3:
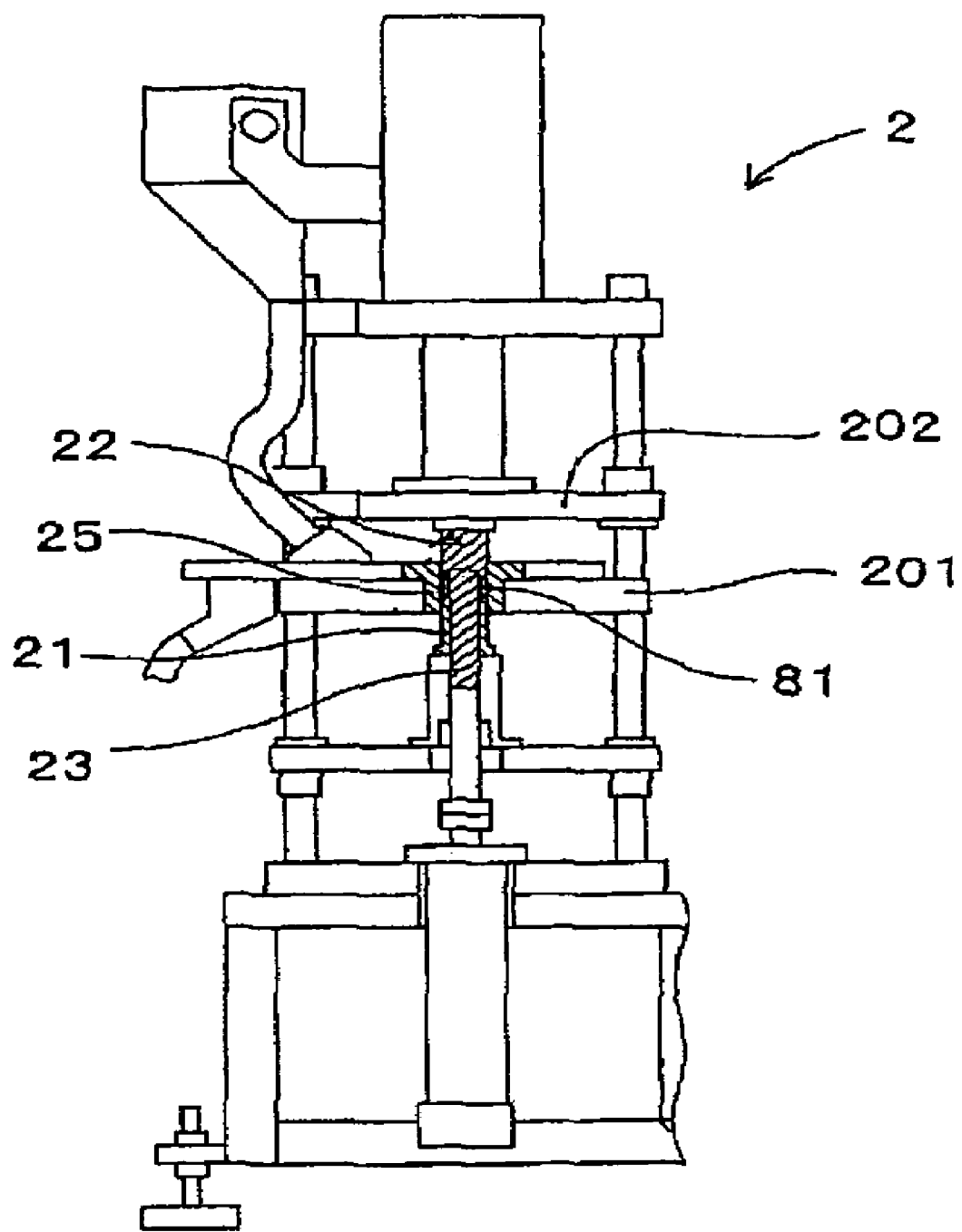
FIG. 3 is a diagram showing a preforming section in the embodiment 1, which is seen from a front thereof.

And, as shown in FIGS. 3 and 6, the preforming section 2 is arranged such that the above-described annular cavity 20 is charged with the compound 80 prepared by mixing an anisotropic magnet powder and a thermosetting resin, and compression-forming is performed in the annular cavity 20 with the first upper punch 22 and the first lower punch 21, thereby obtaining an annular preformed body 81.

Figure 17:
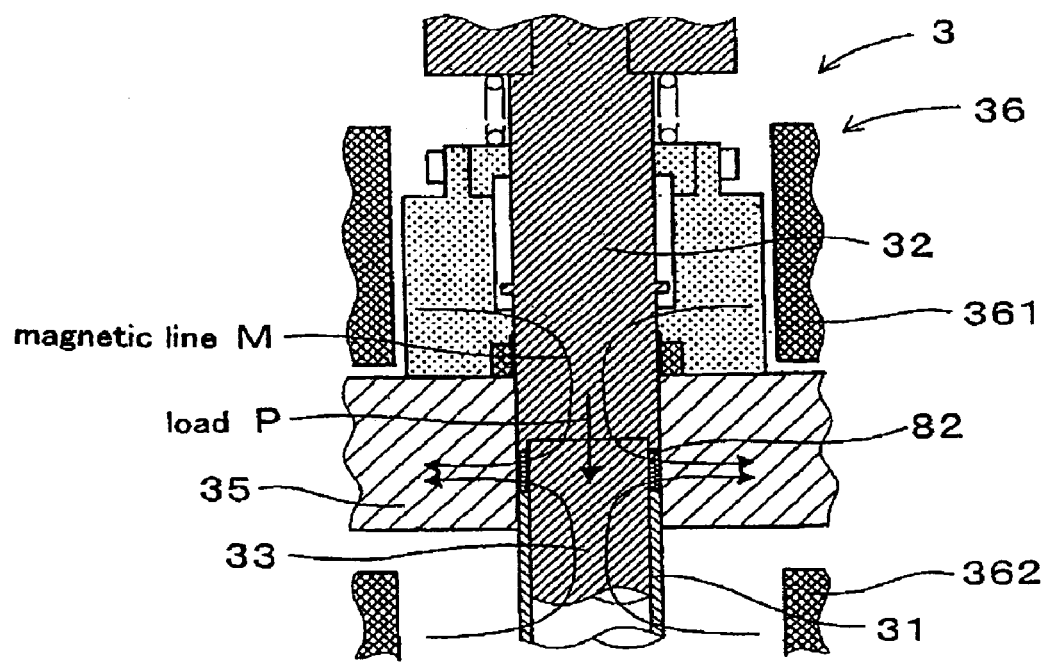
FIG. 17 is a diagram showing the state where a magnetic field is applied by means of magnetic field applying means, and pressure-forming is performed by the second upper punch and the second lower punch in the magnetic field orienting and forming section of the embodiment 1, thereby forming an annular intermediate formed body.

And, as shown in FIGS. 1 and 17, the magnetic field orienting and forming section 3 has a second die 35 for supporting an outer peripheral surface of the annular preformed body 81, a second core 33 for supporting an inner peripheral surface of the annular preformed body 81, a second lower punch 31 for supporting a bottom surface of the annular preformed body 81, and a second upper punch 32 facing the second lower punch 31. In addition, the magnetic field orienting and forming section 3 has magnetic field applying means 36 for applying a magnetic field to the annular preformed body 81, and second heating means 37 for heating the annular preformed body 81.

Figure 10:
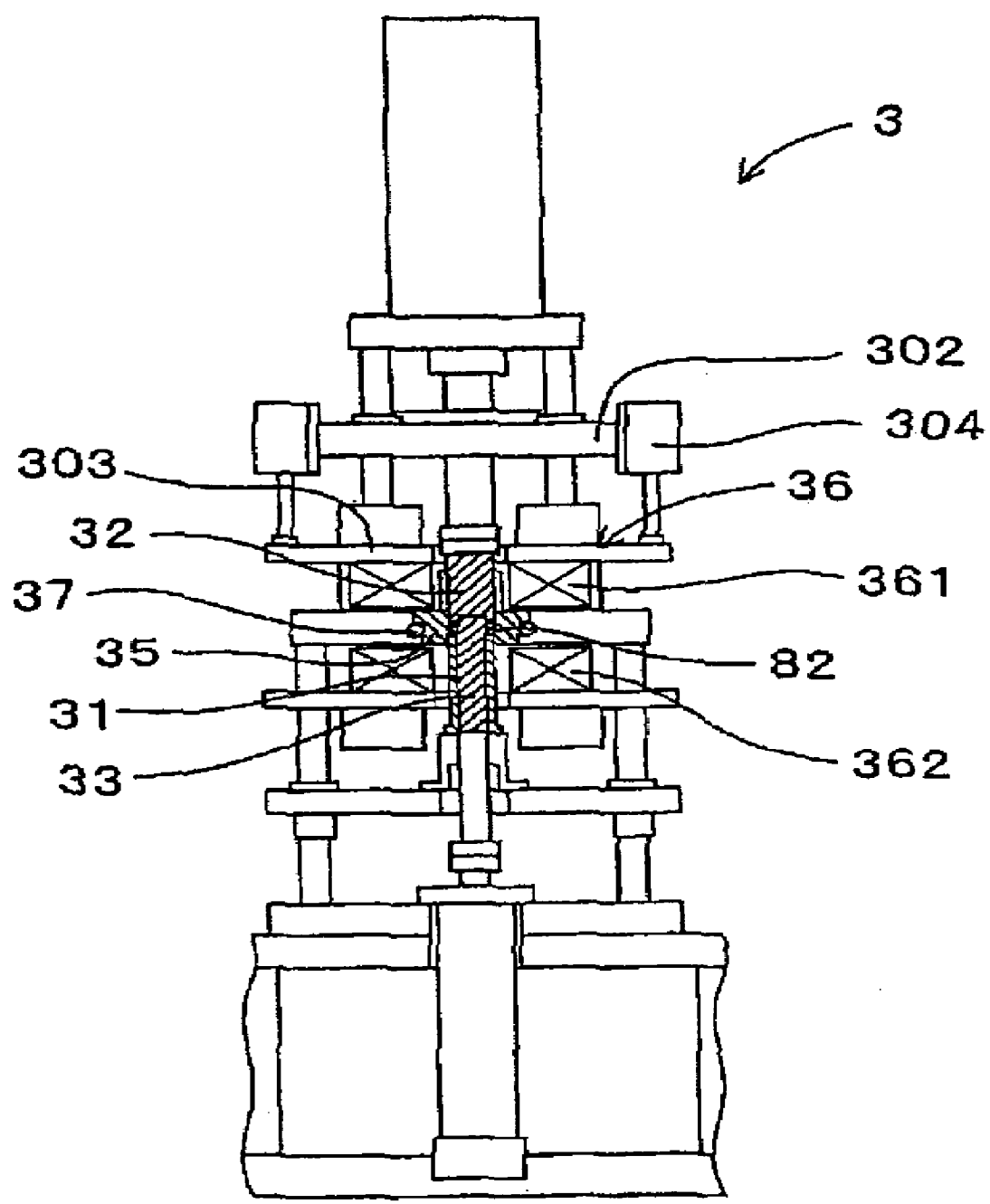
FIG. 10 is a diagram showing a magnetic field orienting and forming section in the embodiment 1, which is seen from a front thereof.

And, as shown in FIGS. 10 and 17, the magnetic field orienting and forming section 3 heats the annular preformed body 81 with the second heating means 37, and orients the magnetic field of the anisotropic magnet powder in the annular preformed body 81 with the magnetic field applying means 36 with the thermosetting resin melted in the annular preformed body 81, and at the same time, pressure is applied to the annular preformed body 81 with the second upper punch 32 and the second lower punch 31, thereby obtaining an annular intermediate formed body 82. Hereinafter, the process of orienting the magnetic field and applying pressure may be referred to as "magnetic field orienting and forming".

Figure 22:
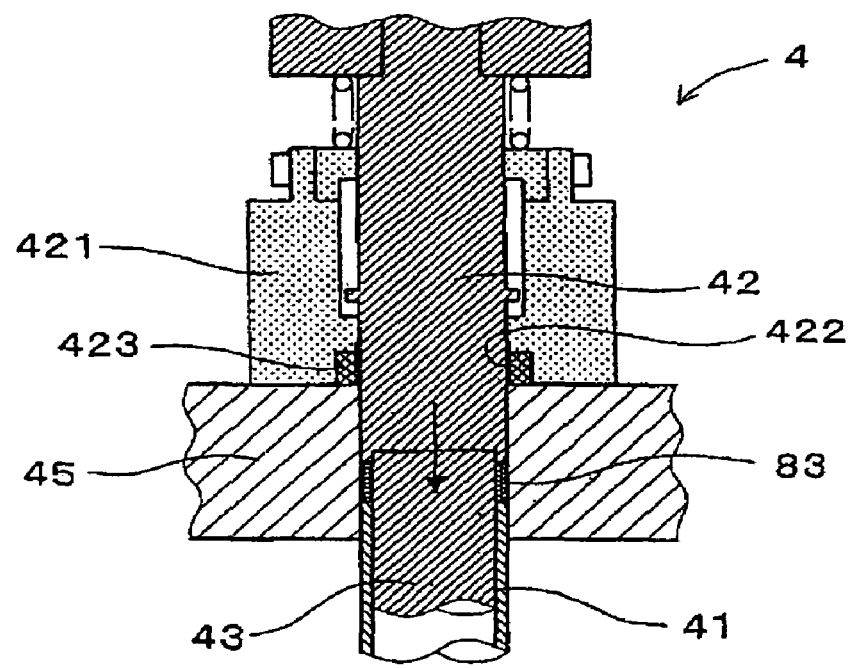
FIG. 22 is a diagram showing the state where pressure-forming is performed by the third upper punch and the third lower punch in the main forming section of the embodiment 1 to mold the annular magnet.

And, as shown in FIGS. 1 and 22, the main forming section 4 has a third die 45 for supporting an outer peripheral surface of the intermediate formed body 82, a third core 43 for supporting an inner peripheral surface of the intermediate formed body 82, a third lower punch 41 for supporting a bottom surface of the annular intermediate formed body 82, a third upper punch 42 facing the third lower punch 41, and third heating means 46 for heating the annular intermediate formed body 82.

Figure 18:
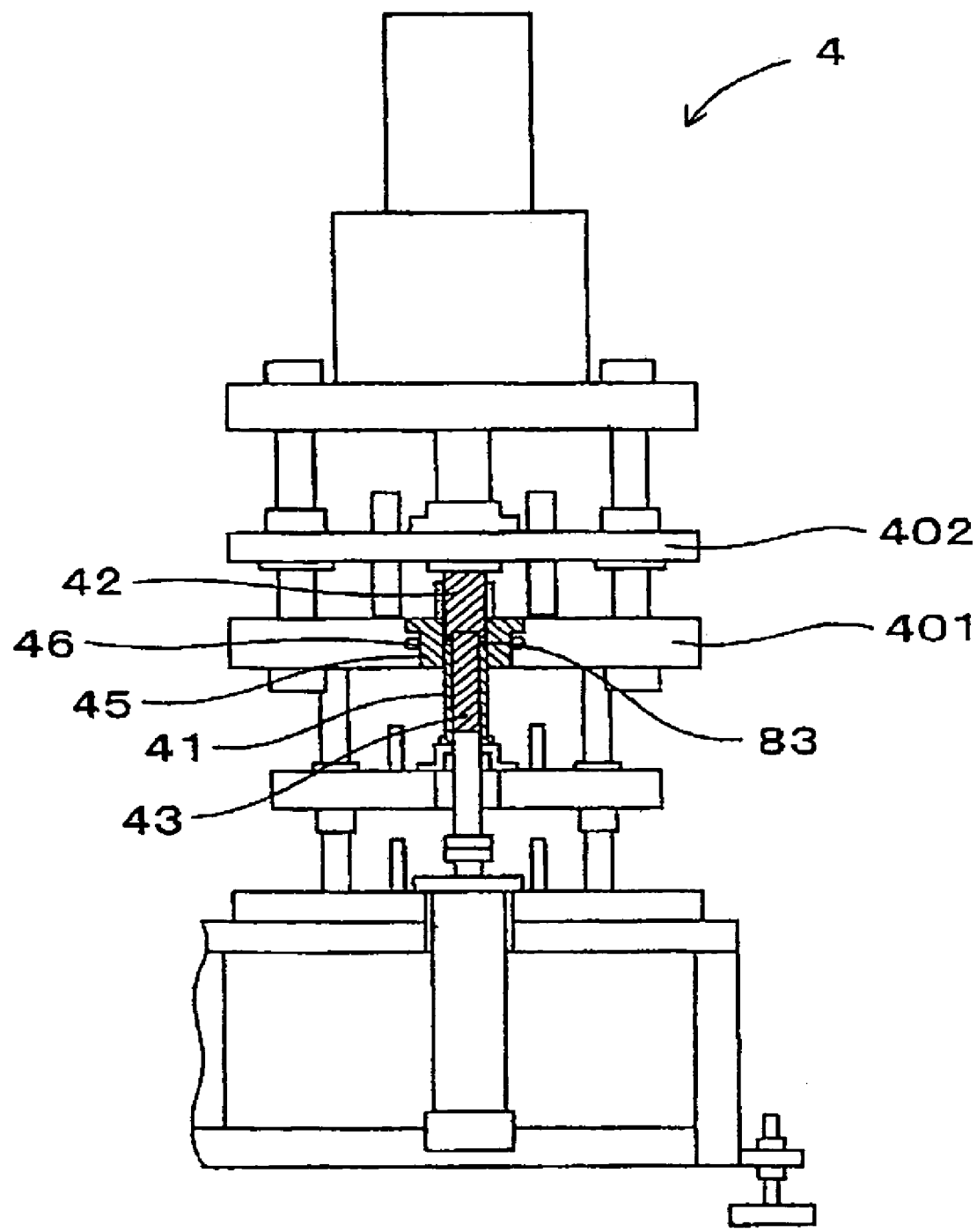
FIG. 18 is a diagram showing the main forming section of the embodiment 1, which is seen from a front thereof.

And, as shown in FIGS. 18 and 22, the main forming section 4 heats the annular intermediate formed body 82, and at the same time, pressure is applied to the annular intermediate formed body 82 with the third upper punch 42 and the third lower punch 41, thereby obtaining an annular magnet 83. Hereinafter, the process of applying pressure in the main forming section 4 may be referred to as "main forming".

In addition, as shown in FIG. 2, the device 1 has a work transferring section 5 for supporting the annular preformed body 81 and transferring it from the preforming section 2 to the magnetic field orienting and forming section 3 while supporting the annular intermediate formed body 82 and transferring it from the magnetic field orienting and forming section 3 to the main forming section 4.

Figure 4:
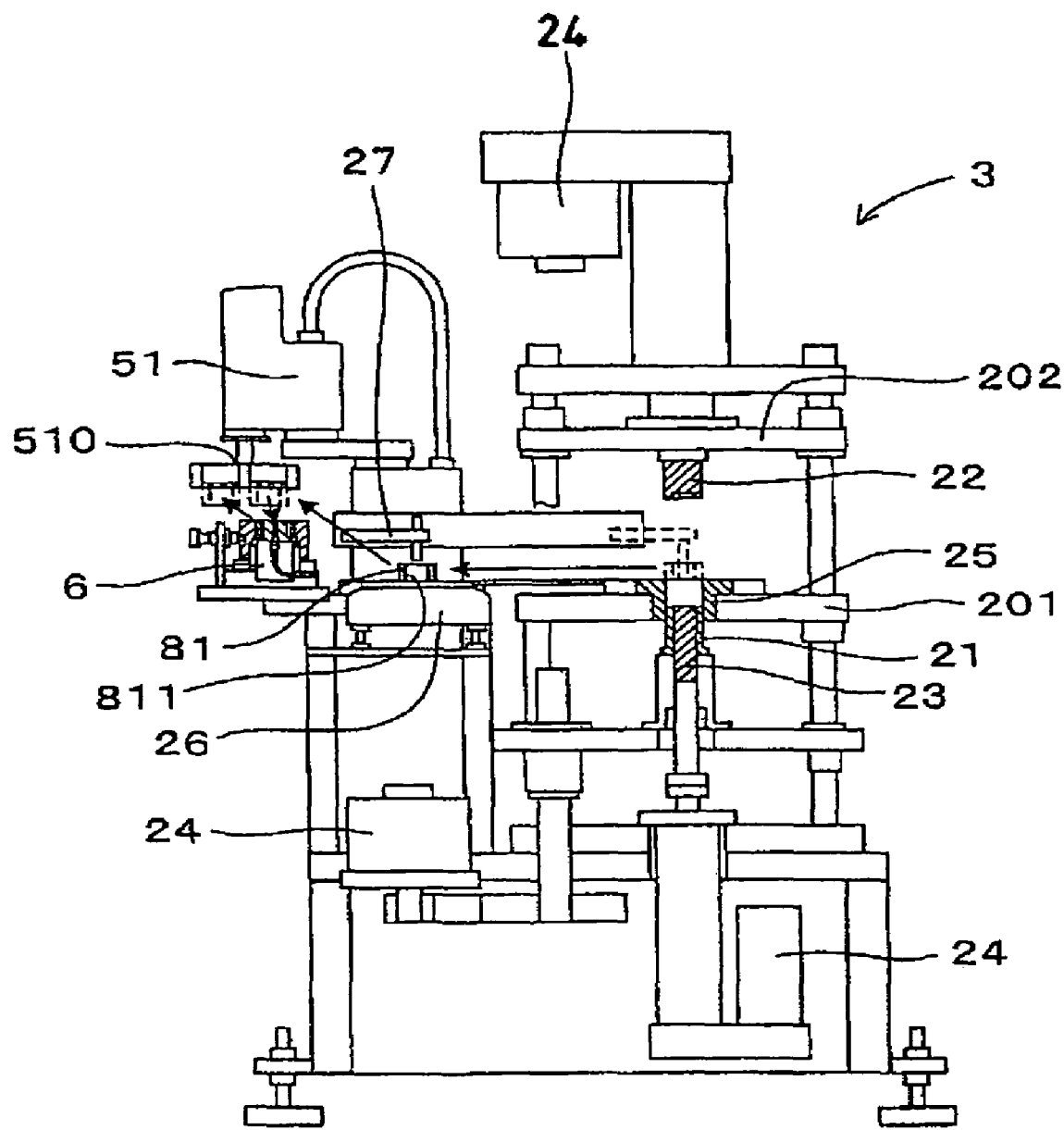
FIG. 4 is a diagram showing a preforming section and a transfer robot in the embodiment 1, which is seen from a side thereof.
Figure 11:
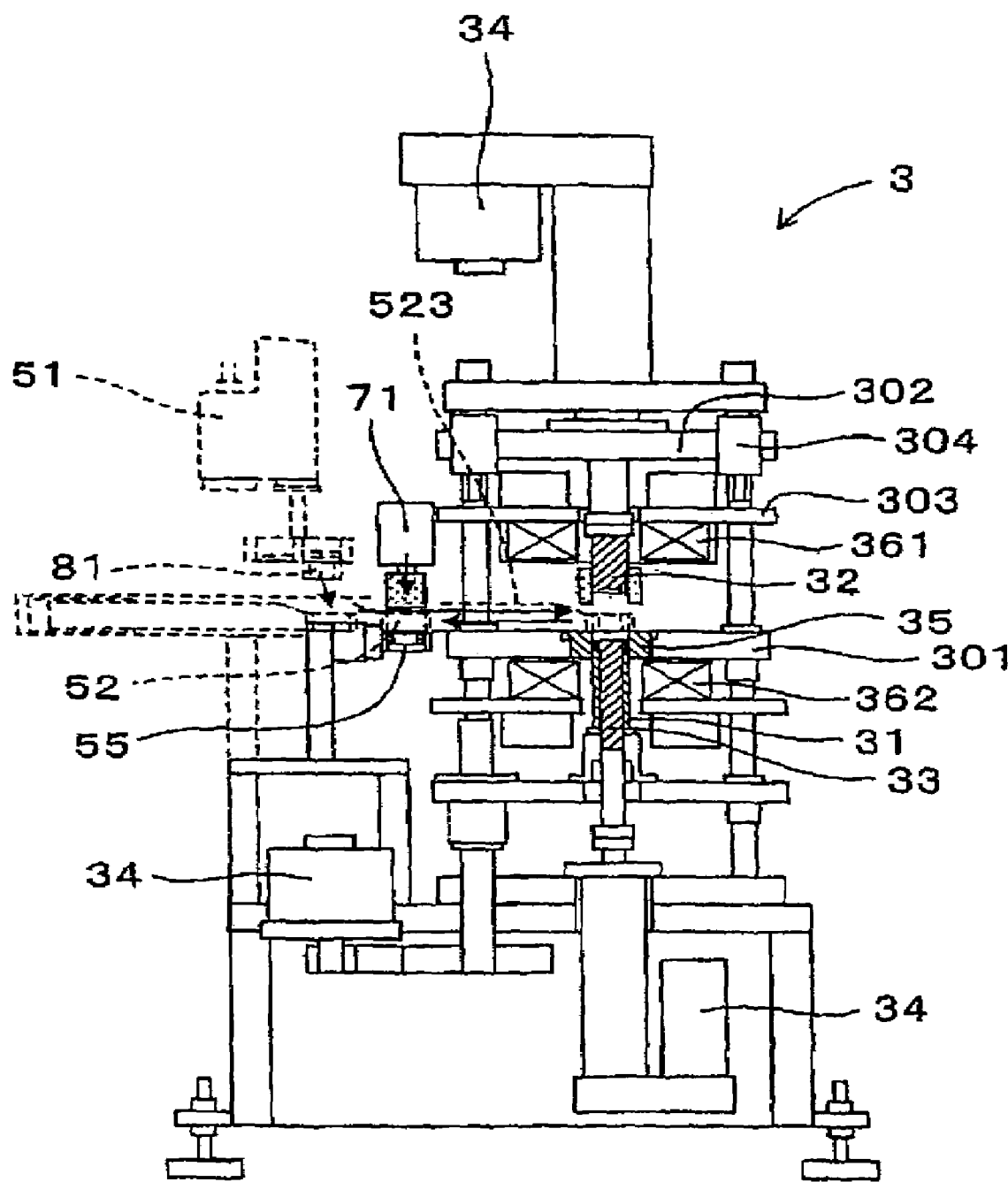
FIG. 11 is a diagram showing the magnetic field orienting and forming section in the embodiment 1, which is seen from a side thereof.
Figure 19:
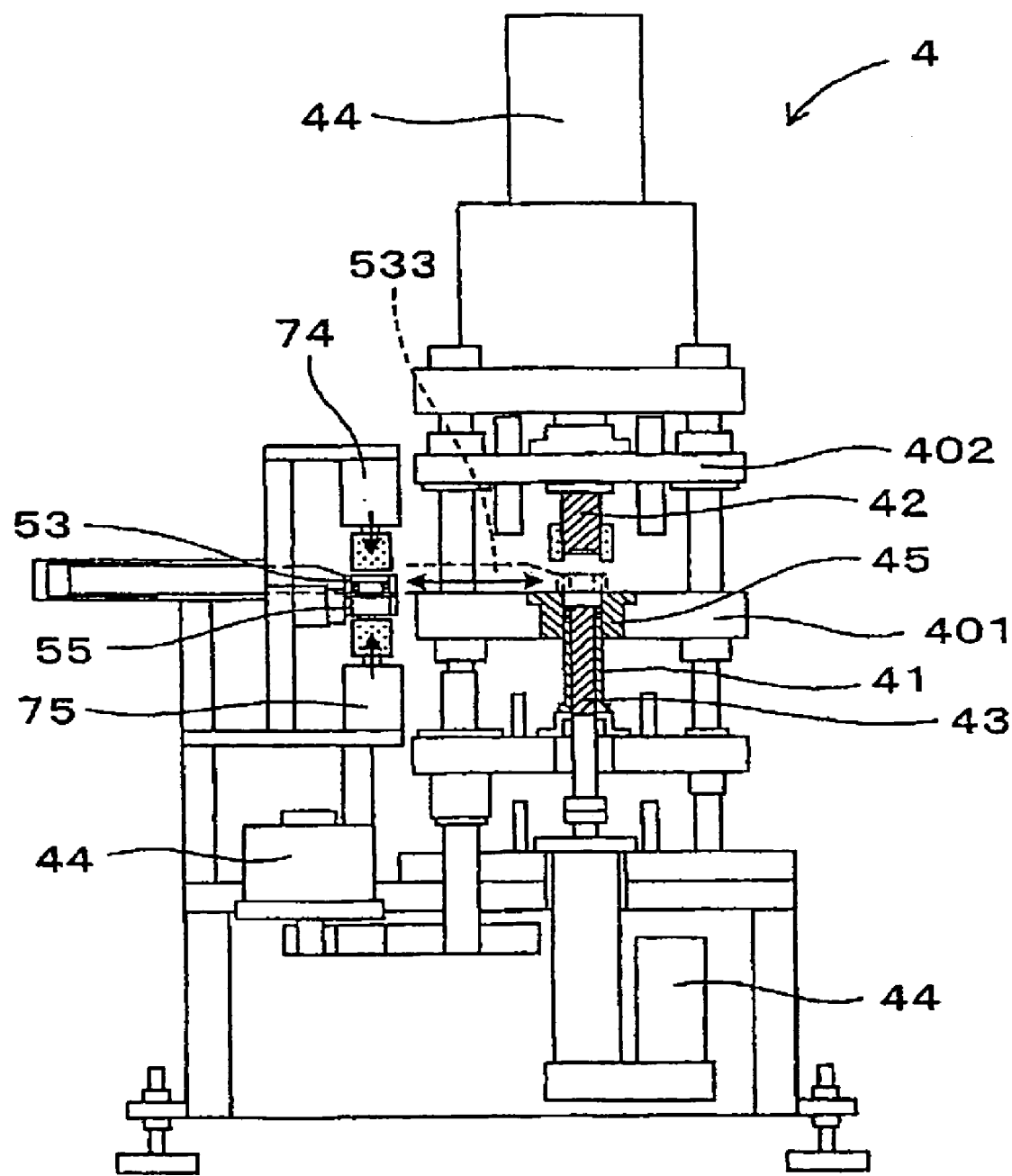
FIG. 19 is a diagram showing the main forming section of the embodiment 1, which is seen from a side thereof.

And as shown in FIGS. 4, 11 and 19, the first through third upper punches 22, 32, 42, the first through third lower punches 21, 31, 41 and the first through third cores 23, 33, 43 are so arranged as to be driven with servomotors 24, 34, 44, respectively.

In addition, as shown in FIGS. 2, 4, 6, the preforming section 2 has mass measuring means 26 for measuring the mass of this annular preformed body 81 after forming thereof. And the first lower punch 21 is arranged such that the position thereof before the compression forming step is varied with the servomotor 24 based on the mass of the annular preformed body 81, which has been measured with the mass measuring means 26, to vary the volume of the annular cavity 20.

Hereinafter, the above-described arrangement will be explained in detail.

(Main Arrangement of the Device)

Figure 26:
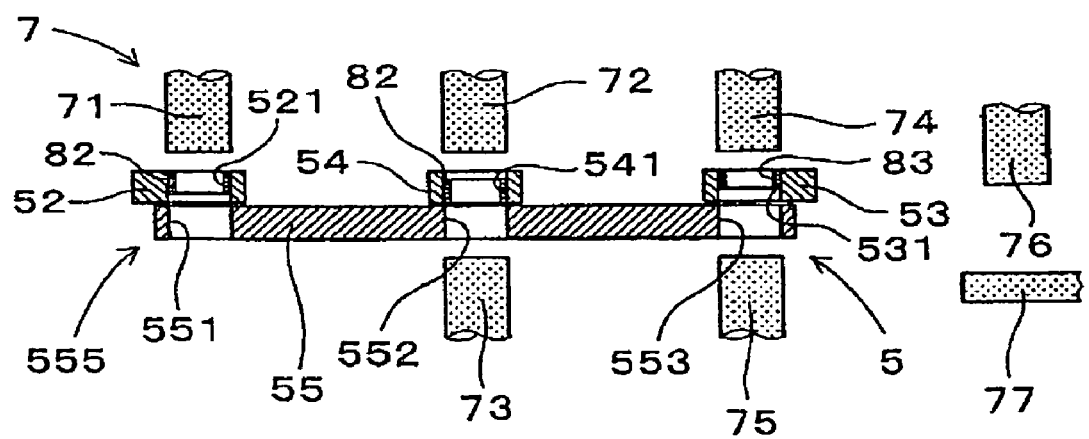
FIG. 26 is a diagram showing the state where the cassette for the magnetic field orienting and forming section and the cassette for the main forming section of the embodiment 1 respectively carry works out of the magnetic field orienting and forming section and the main forming section.

As shown in FIGS. 2, 26, the device 1 for producing an annular magnet in the present embodiment has a preforming section 2 provided with mass measuring means 26, magnetic field orienting and forming section 3, main forming section 4, work transferring section 5, later-described lubricating oil impregnating section 6 and work loading section 7.

In addition, the work transferring section 5 has a later-described transfer robot 51, a cassette 52 for the magnetic field orienting and forming section, a cassette 53 for the main forming section, and a loader cassette 55. In addition, the preforming section 2 has a later-described transfer bar 27.

In addition, in the above-described device 1, the servomotors 24, 34, 44 for driving the first through third upper punchs 22, 32, 42, first through third lower punches 21, 31, 41 and first through third cores 23, 33, 43 are controlled with control means (not shown). In addition, the operations of the mass measuring means 26, transfer bar 27, magnetic field applying means 36, transfer robot 51, cassette 52 for the magnetic field orienting and forming section, cassette 53 for the main forming section, loader cassette 55, lubricant oil impregnating section 6, work loading section 7 or the like are also controlled with the controlling means, respectively.

Namely, a series of operations in the device 1 of the present embodiment are controllable with the controlling means.

And, as shown in FIGS. 1, 2, the preforming section 2, the magnetic field orienting and forming section 3, and the main forming section 4 are provided in a common base plate 10. And the preforming section 2, the magnetic field orienting and forming section 3, the main forming section 4, the work transferring section 5, the lubricating oil impregnating section 6 and the work loading section 7 are integrally secured to the base plate 10. And the base plate 10 is provided on an upper surface of a bed 11.

(Flow of the Production of Annular Magnet)

The device 1 for producing an annular magnet in the present embodiment produces an annular magnet 83 from the above-described compound 80 in the following flow (see FIG. 2).

Namely, as shown in FIGS. 3, 4, the annular preformed body 81 is formed from the compound 80 in the preforming section 2, and is transferred to the mass measuring means 26 by way of the transfer bar 27. Then, the mass of the annular preformed body 81 is measured in the mass measuring means 26, and when the measured mass is within the range of a favorable mass value, the annular preformed body 81 is transferred to the lubricant oil impregnating section 6 by means of the transfer robot 51.

Figure 8:
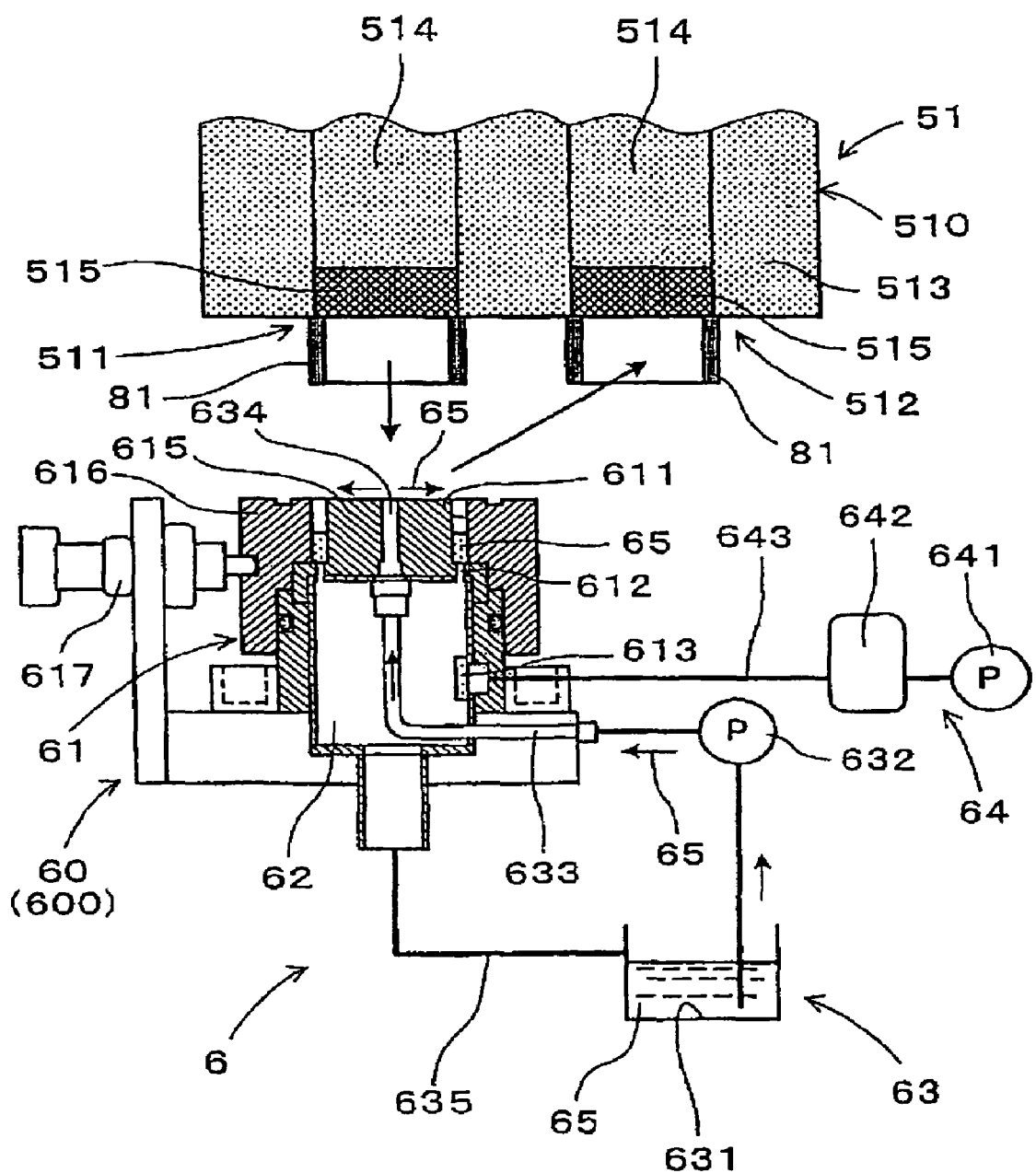
FIG. 8 is a diagram showing a lubricant oil impregnating section in the embodiment 1, in the state where a lubricant oil is fed.
Figure 9:
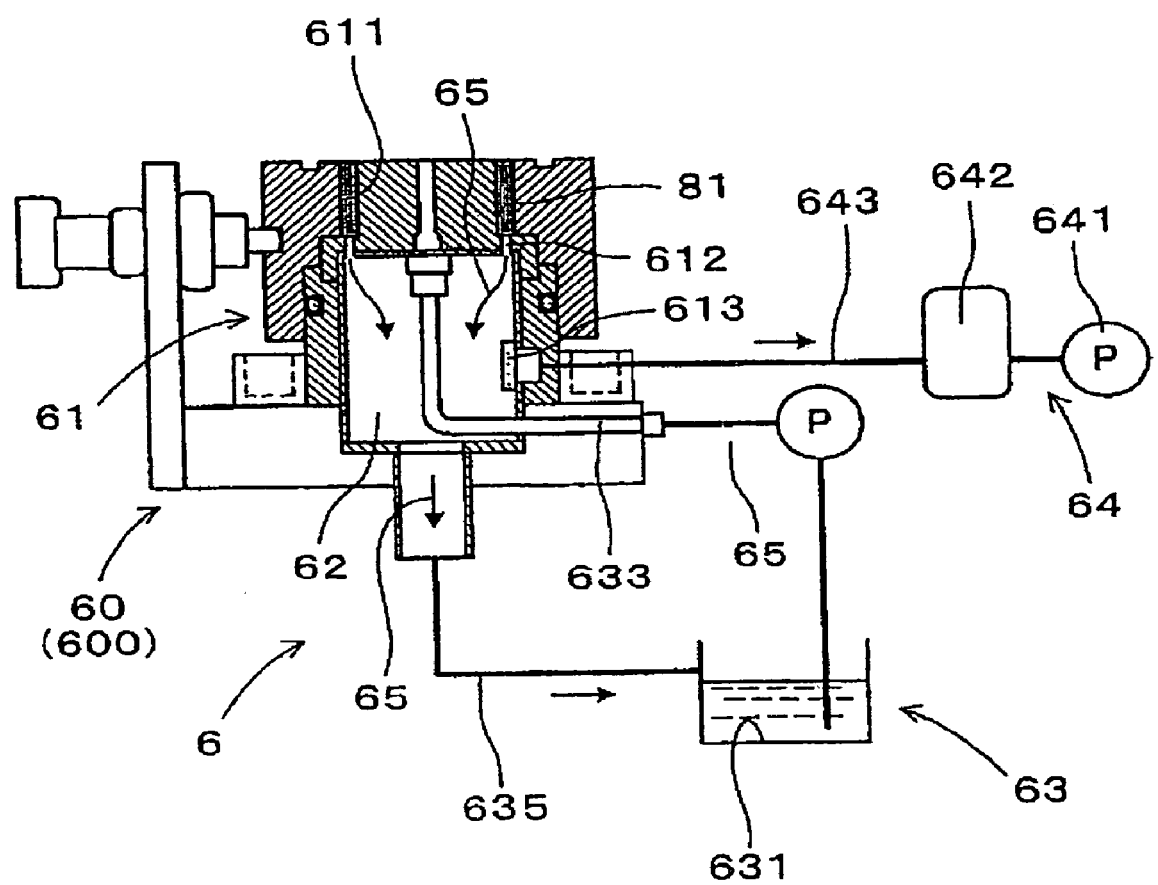
FIG. 9 is a diagram showing the lubricant oil impregnating section in the embodiment 1, from which an excess amount of lubricant oil in the annular preformed body is sucked.

Next, as shown in FIGS. 8, 9, in the lubricant oil impregnating section 6, the annular preformed body 81 is impregnated with a lubricant oil 65, and then, this annular preformed body 81 is transferred to the cassette 52 for the magnetic field orienting and forming section by means of the above-described transfer robot 51

Next, as shown in FIGS. 10, 11, the annular preformed body 81 is carried in the magnetic field orienting and forming section 3 by means of the cassette 52 for the magnetic field orienting and forming section. And in the magnetic field orienting and forming section 3, the annular preformed body 81 is subjected to magnetic field orienting and forming, thereby forming the above-described annular intermediate formed body 82. Then, this annular intermediate formed body 82 is carried out to the loader cassette 55 by means of the cassette 52 for the magnetic field orienting and forming section.

Next, as shown in FIGS. 18, 19, the annular intermediate formed body 82 is transferred to the cassette 53 for the main forming section by means of the loader cassette 55. And the annular intermediate formed body 82 is transferred to the main forming section 4 by means of the cassette 53 for the main forming section. And in the main forming section 4, the annular intermediate formed body 82 is further formed to obtain the annular magnet 83. Then, this annular magnet 83 is carried out to the loader cassette 55 by means of the above-described cassette 53 for the main forming section.

Next, as shown in FIG. 2, the annular magnet 83 is transferred to an unloading section 77 by means of the loader cassette 55, and is fed out of the device 1 to an unloading shoot 78.

Then, residual magnetization in the annular magnet 83 is removed, and the annular magnet 83 is magnetized to N pole and S pole, thereby obtaining the annular magnet 83 having a magnetic force.

Hereinafter, the arrangement of the device 1 will be explained in detail.

(Preforming Section)

First, the preforming section 2 will be explained.

As shown in FIGS. 1, 3, the preforming section 2 has an opening on the lower side thereof, and has a rubbing jig 281 that holds the compound 80 and moves on the first die 25. By this rubbing jig 281, the compound 80 can be placed on the first lower punch 21 and the first core 23. And this rubbing jig 281 is arranged such that the annular preformed body 81 after forming can be moved from the providing position of the first lower punch 21 to a prescribed transferring position.

In addition, the preforming section 2 has a compound tank 282 for storing the compound 80. And the preforming section 2 is arranged such that the compound 80 falls from the compound tank 282 and is fed to the inside of the rubbing jig 281.

In addition, as shown in FIGS. 2, 4, the preforming section 2 has a transfer bar 27 for transferring the annular preformed body 81 which has been moved to the prescribed transfer position by means of the rubbing jig 281 to the mass measuring means 26. This transfer bar 27 is inserted in a through hole 811 of the annular preformed body 81, and transfers the annular preformed body 81 to the mass measuring means 26 while retaining the same.

And the mass measuring means 26 is so arranged as to measure the mass of the annular preformed body 81 after subjecting each of the annular preformed bodies 81 prior to the mass measurement to zero amendment. With this arrangement, the measurement accuracy of the mass measuring means 26 can be improved. The "zero amendment" means the resetting of this mass measuring means 26 with the value indicated by the mass measuring means 26 prior to the mass measurement as 0. In the present embodiment, the mass measuring means 26 is composed of a mass meter.

And, as shown in FIGS. 3, 4, the preforming section 2 has a first stationary table 201 in which the first die 25 is embedded, and a first pressure table 202 provided with the first upper punch 22. And the first pressure table 202 is so arranged as to descend upon receiving a driving force of the servomotor 24.

And, the rubbing jig 281 is so arranged as to slide on the first stationary table 201, and the transfer bar 27 is so arranged as to transfer the annular preformed body 81 while sliding the same on the first stationary table 201.

(Magnetic Field Orienting and Forming Section)

Next, the magnetic field orienting and forming section 3 will be explained.

As shown in FIGS. 1, 10, the magnetic field applying means 36 in the present embodiment is composed of a circular annular lower magnetic field coil 362 which is disposed under the second die 35, and an annular upper magnetic field coil 361 which is to be disposed above the second die 35 upon applying pressure. And in the present embodiment, a magnetic field is applied to the annular preformed body 81 in radial directions by means of a pair of upper and lower magnetic field coils 361 and 362 to orient a magnetic field in radial directions.

In a modified embodiment, the magnetic field applying means 36 may be composed of a pair of magnetic field coils that are disposed sidewardly of the second die 35 so as to hold the same. In this case, a magnetic field is applied to the annular preformed body 81 in an axial direction to enable the axial orientation of magnetic field.

And the second heating means 37 of the present embodiment is composed of a heater that is embedded in the vicinity of this second die 35 for heating the second die 35.

As shown in FIGS. 10, 11, the magnetic field orienting and forming section 3 has a second stationary table 301 in which the second die 35 is embedded, a second pressure table 302 provided with the second upper punch 32 and a second pressure sub-table 303 provided with the upper magnetic field coil 361. And the second pressure table 302 is so arranged as to descend upon receiving a driving force of the servomotor 34, and the second pressure sub-table 303 is so arranged as to descend prior to the second pressure table 302.

In addition, the second pressure table 302 is provided with a cylinder 304 (air cylinder in the present embodiment).

And, a pressure is applied to the second pressure sub-table 303 with the cylinder 304 provided in the second pressure table 302 so that the second pressure sub-table 303 descends prior to the second pressure table 302, and when a pressure is applied to the annular preformed body 81 with the second upper punch 32, the upper magnetic field coil 361 can be moved to the vicinity of the second die 35.

And, as shown in FIG. 11, the cassette 52 for the magnetic field orienting and forming section is so arranged as to carry the annular preformed body 81 in the magnetic field orienting and forming section 3 and carry the annular intermediate formed body 82 out of the magnetic field orienting and forming section 3 while sliding on the second stationary table 301.

Figure 12:
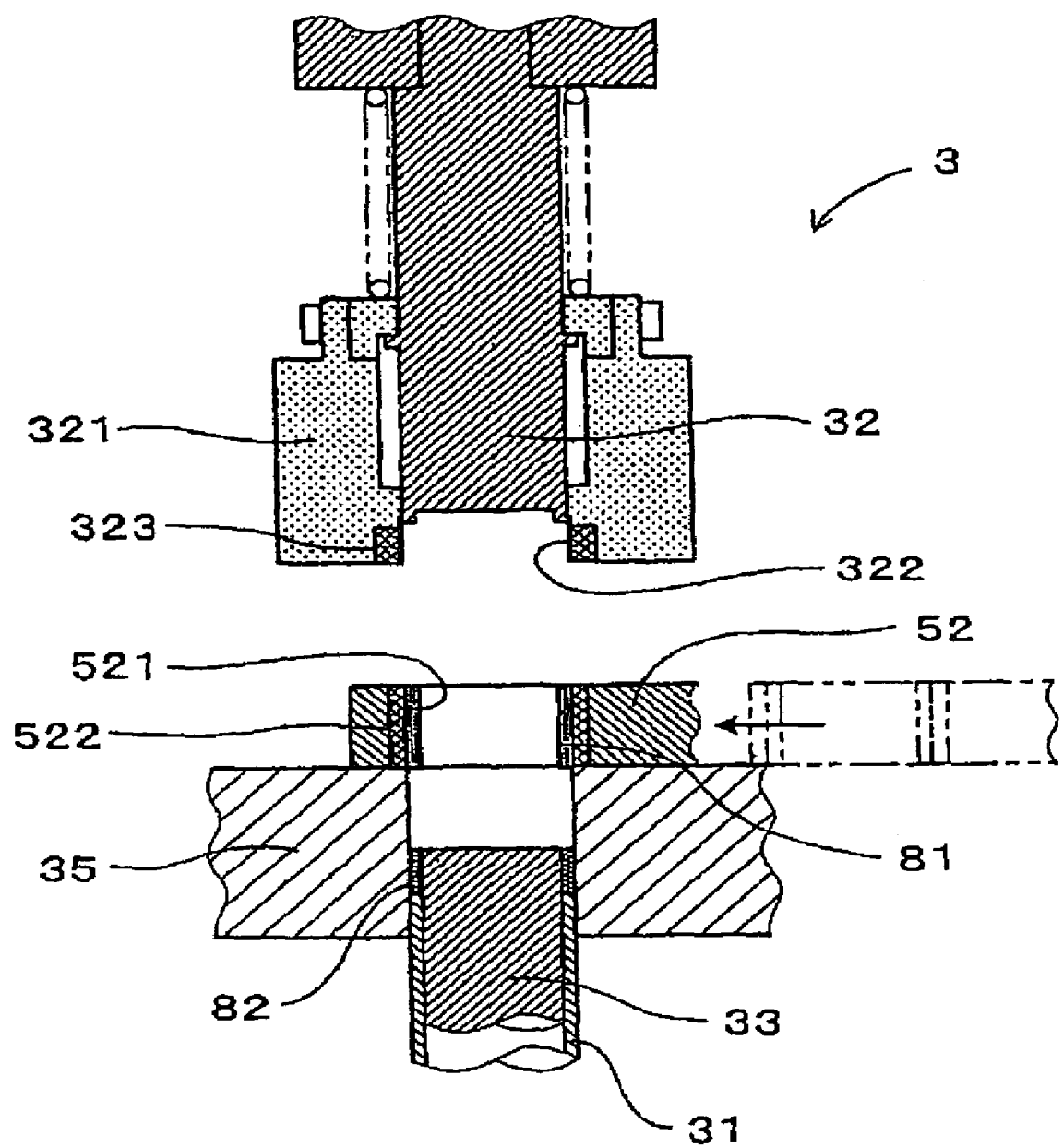
FIG. 12 is a diagram showing the state where a cassette for the magnetic field orienting and forming section is advanced between a second upper punch and a second lower punch of the magnetic field orienting and forming section in the embodiment 1.

And, as shown in FIG. 12, the second upper punch 32 has a work holder 321 which is provided slidably on an outer peripheral surface of the second upper punch 32. This work holder 321 has an annular cross-sectional shape, and is provided with a holder retaining part 322 which can retain the annular preformed body 81 in an inner peripheral surface thereof. The work holder 321 is provided with a magnet 323 in the holder holding part 322 for attracting the annular preformed body 81.

(Main Forming Section)

Next, the main forming section 4 will be explained.

As shown in FIGS. 1, 18, the main forming section 4 has a third stationary table 401 in which the third die 45 is embedded, a third pressure table 402 provided with a third upper punch 42. And the third pressure table 402 is so arranged as to descend upon receiving a driving force of the servomotor 44

And, the cassette 53 for the main forming section is so arranged as to carry the annular preformed body 81 in the main forming section 4 and carry the annular intermediate formed body 82 out of the main forming section 4 while sliding on the third stationary table 401.

And the third heating means 46 of the present embodiment is composed of a heater which is embedded in the vicinity of this third die 45 for heating the third die 45.

Figure 20:
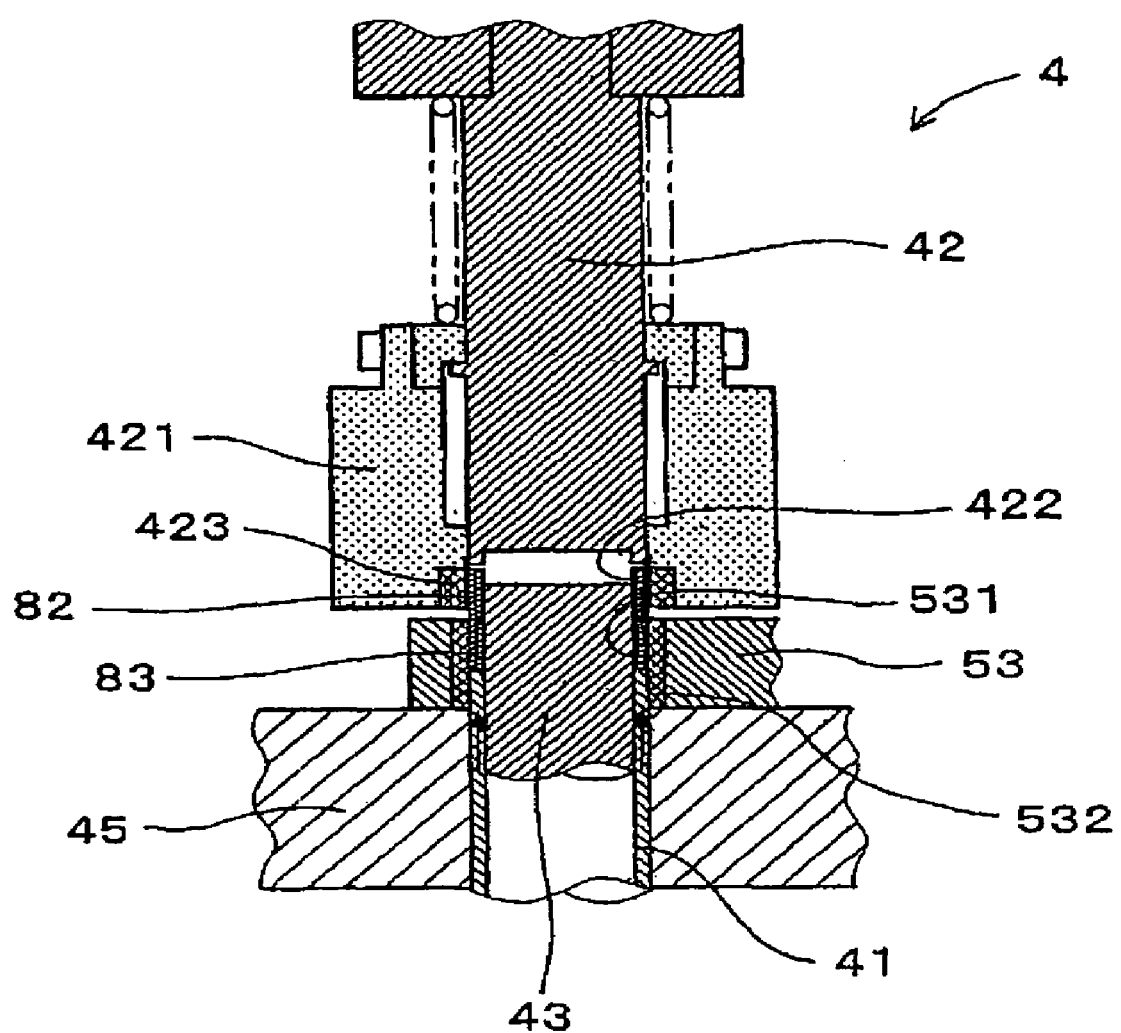
FIG. 20 is a diagram showing the state where the change of the annular intermediate formed body and an annular magnet is performed in the cassette for the main forming section in the embodiment 1.

And, as shown in FIG. 20, the third upper punch 42 has a work holder 421 that is provided slidably on its outer peripheral surface thereof. This work holder 421 has an annular cross-sectional shape, and is provided with a holder retaining part 422 which can retain the annular intermediate formed body 82 in its inner peripheral surface. And the work holder 421 is provided with a magnet 423 in the holder retaining part 422 for attracting the intermediate formed body 82.

And, the preforming section 2, the magnetic field orienting and forming section 3 and the main forming section 4 of the present embodiment respectively compose a motor servopress.

Namely, the first through third upper punches 22, 32, 42, the first through third lower punches 21, 31, 41 and the first through third cores 23, 33, 43 are so arranged as to be driven with the servomotors 24 34, 44, respectively.

And, nuts (not shown) which are respectively screwed to feed screws (not shown) that rotate upon receiving the rotation force of the servomotors 24, 34, 44 are secured to the upper punches 22, 32, 42, the lower punches 21, 31, 41 and the cores 23, 33, 43. The rotation torques of the servomotors 24, 34, 44 are converted to thrust directed in an axial direction of the upper punches 22, 32, 42, the lower punches 21, 31, 41 and the cores 23, 33, 43 with feed screws and feed nuts.

(Lubricant Oil Impregnating Section)

Next, the lubricant oil impregnating section 6 will be explained.

As shown in FIGS. 2, 8, 9, the device 1 for producing the annular magnet has the lubricant oil impregnating section 6 for impregnating a lubricant oil 65 in the annular preformed body 81. This lubricant oil impregnating section 6 has an impregnation jig 60 for disposing the annular preformed body 81, lubricant oil feeding means 63 for feeding the lubricant oil 65 to the annular preformed body 81 in this impregnation jig 60, and sucking means 64 for sucking an excess lubricant oil 65 impregnated in the annular preformed body 81 in the impregnation jig 60. In addition, the lubricant oil impregnating section 6 has a lubricant oil tank 631 for storing the lubricant oil 65.

As shown in FIGS. 8 and 9, the impregnation jig 60 has a work retaining frame 61 for inserting and disposing the annular preformed body 81, and a suction box 62 which is made vacuum with the suction means 64 is disposed below the work retaining frame 61.

In addition, in the work retaining frame 61, a lubricant oil feed groove 611 for inserting and disposing an entire part of the annular preformed body 81 and feeding the lubricant oil thereto, is provided. And a large number of suction holes 612 are formed below the lubricant oil feeding groove 611 for dropping an excess lubricant oil 65 impregnated in the annular preformed body 81 into the suction box 62.

The work retaining frame 61 is composed of an inner periphery holding part 615 for holding an inner peripheral surface of the annular preformed body 81 along with a bottom surface thereof, and an outer periphery holding part 616 for holding an outer peripheral surface of the annular preformed body 81. And the outer periphery holding part 616 is detachable by operating a plunger 617 adapted to secure the outer periphery holding part 616.

And, as shown in FIGS. 8, 9, the lubricant oil feeding means 63 has a feeding pump 632 for feeding the lubricant oil 65 from the lubricant oil tank 631 to the impregnation jig 60, and a feeding pipe 633 for feeding the lubricant oil 65 from this feeding pump 632 to the impregnation jig 60. And a tip end 634 of the feeding pipe 633 opens in an upper surface of the impregnation jig 60 in the position inwardly of the lubricant oil feeding groove 611.

And the suction means 64 has a suction pump 641 for sucking an excess lubricant oil 65 from the annular preformed body 81, and a suction tank 642. And the suction pump 641 and the suction tank 642 are connected to the suction box 62 by way of a suction pipe 643. And the suction pump 641 is composed of a vacuum pump adapted to suck air from the suction box 62. And the excess lubricant oil 65 which has been sucked by the suction pump 641 from the annular preformed body 81 and dropped into the suction box 62 is recovered in the lubricant oil tank 631 without being sucked by the suction pump 641.

And a filter 613 is disposed in the position in which the suction pipe 643 opens in the suction tank 642 for preventing the compound 80 and the lubricant oil 65 from being sucked into the suction pump 641. And the bottom of the suction box 62 is connected to the lubricant oil tank 631 with a return pipe 635 for returning the lubricant oil 65 which has dropped from the suction holes 612 of the impregnation jig 60 to the lubricant oil tank 631.

And, as shown in FIG. 2, the device 1 is also provided with an auxiliary impregnation jig 600 with a similar arrangement to that of the impregnation jig 60. The auxiliary impregnation jig 600 is so arranged as to be used instead of the impregnation jig 60 when any trouble occurs in the impregnation jig 60 during use.

(Transfer of Work)

Next, the work transferring section 5 will be explained.

As shown in FIG. 2, the work transferring section 5 is arranged such that works such as the preformed body 81, intermediate formed body 82, or the annular magnet 83 are transferred from the mass measuring means 26 to the lubricant oil impregnating section 6, from the lubricant oil impregnating section 6 to the magnetic field orienting and forming section 3, from the magnetic field orienting and forming section 3 to the main forming section 4, and from the main forming section 4 to the unloading section 77.

And the work transferring section 5 of the present embodiment has the transfer robot 51, cassette 52 for the magnetic field orienting and forming section, the cassette 53 for the main forming section and the loader cassette 55.

As shown in FIGS. 2, 4 and 11, the transfer robot 51 holds the annular preformed body 81 prior to the impregnation with the lubricant oil, and transfers the same from the mass measuring means 26 to the lubricant oil impregnating section 6, and holds the annular preformed body 81 after the impregnation with the lubricant oil, and transfers the same from the lubricant oil impregnating section 6 to the cassette 52 for the magnetic field orienting and forming section.

As shown in FIGS. 2, 11, the cassette 52 for the magnetic field orienting and forming section receives the annular preformed body 81 from the transfer robot 51, carries the same in the magnetic field orienting and forming section 3, receives the annular intermediate formed body 82 after forming from the magnetic field orienting and forming section 3 and carries the same out of the magnetic field orienting and forming section 3.

And, as shown in FIGS. 2, 26, the loader cassette 55 receives the annular intermediate formed body 82 from the cassette 52 for the magnetic field orienting and forming section, and delivers the same to the cassette 53 for the main forming section.

And, as shown in FIGS. 2, 19, the cassette 53 for the main forming section receives the annular intermediate formed body 82 from the loader cassette 55, carries the same in the main forming section 4 and carries the annular magnet 83 from the main forming section 4 to the loader cassette 55.

(Transfer Robot)

Next, the transfer robot 51 will be explained in detail.

As shown in FIGS. 4, 8, the transfer robot 51 has two work attracting parts 511, 512, each having a head part 510 which is adapted to attract the annular preformed body 81 and hold the same. The head part 510 has a stationary part 513 and a slide part 514 which is slidably disposed in the stationary part 513. A magnet 515 is provided at an end of the slide part 514.

And, the transfer robot 51 is arranged such that when the slide part 514 is advanced, the annular preformed body 81 can be attracted to the magnet 515, and when the slide part 514 is moved back, the annular preformed body 81 can be separated from the magnet 515.

And, the transfer robot 51 is arranged such that one work attracting part 511 can attract the annular preformed body 81 prior to impregnation with a lubricant oil, and another work attracting part 512 can attract the annular preformed body 81 after impregnation with a lubricant oil.

(Cassette for Magnetic Field Orienting and Forming Section and Cassette for Main Forming Section)

Next, the cassette 52 for the magnetic field orienting and forming section and the cassette 53 for the main forming section will be explained in detail.

Figure 15:
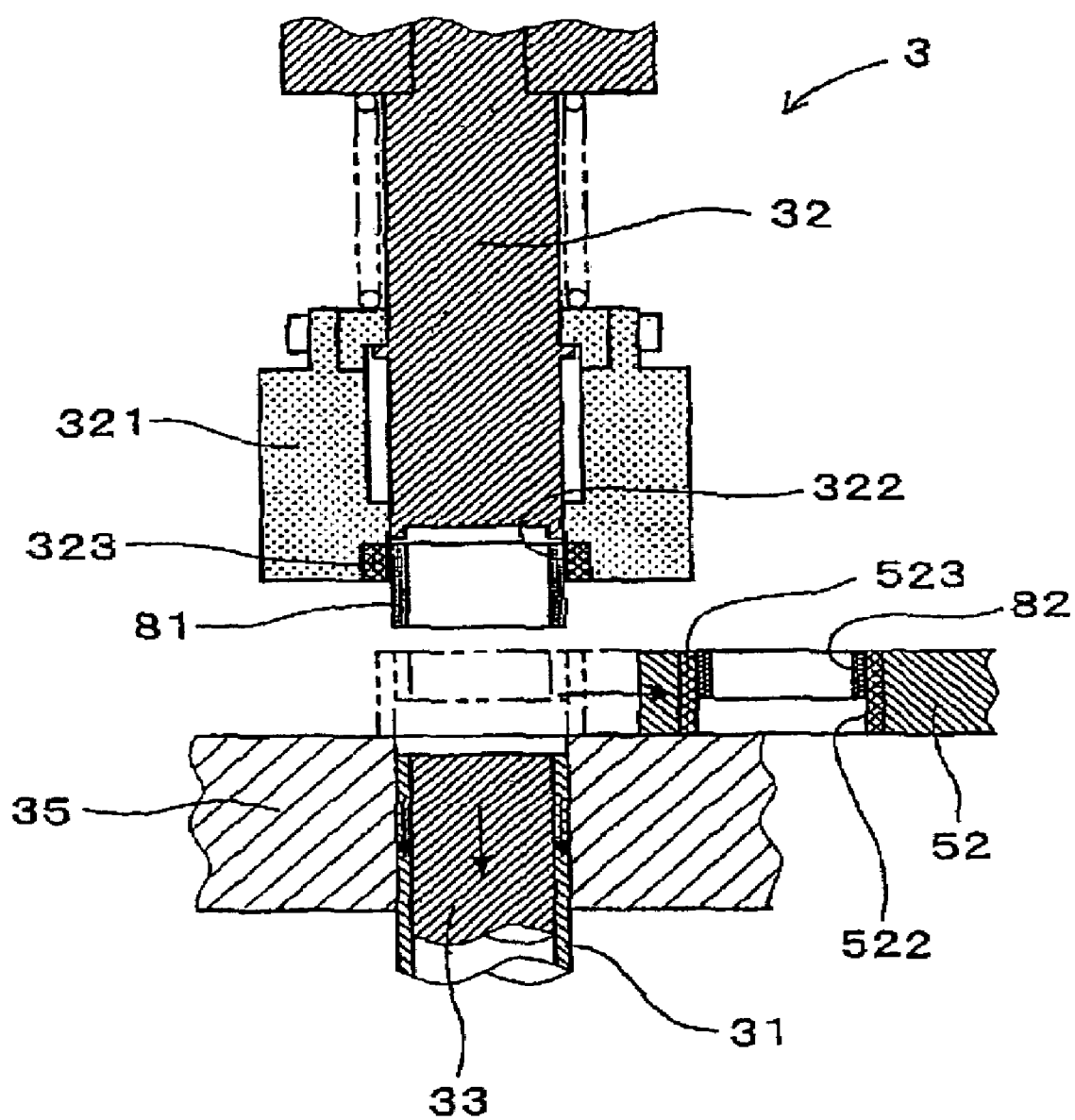
FIG. 15 is a diagram showing the state where the cassette for the magnetic field orienting and forming section is moved back from the position between the second upper punch and the second lower punch in the embodiment 1.

As shown in FIGS. 12, 15, the cassette 52 for the magnetic field orienting and forming section is so arranged as to hold an annular formed body 81 which will be subjected to the following magnetic field orienting and forming process, and advance to the position between the second upper punch 32 and the second lower punch 31, supply the annular formed body 81 to the second upper punch 32, receive the annular intermediate formed body 82 which has been subjected to the last magnetic field orienting and forming process, hold the annular intermediate formed body 82, and move back from the position between the second upper punch 32 and the second lower punch 31.

Figure 14:
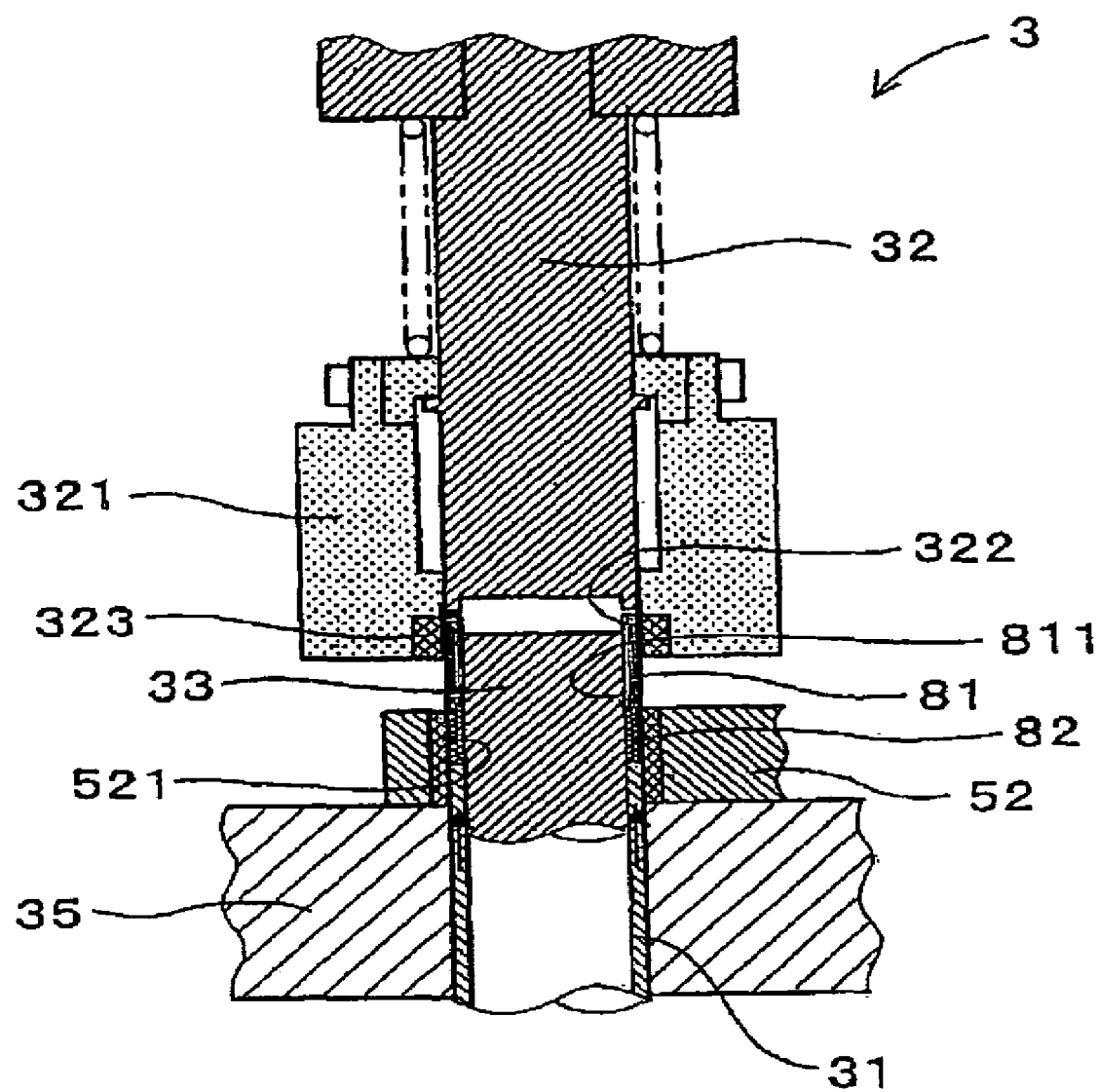
FIG. 14 is a diagram showing the state where the change of the annular. preformed body and an annular intermediate formed body is performed in the cassette for the magnetic field orienting and forming section in the embodiment 1.

And, as shown in FIG. 14, the cassette 52 for the magnetic field orienting and forming section is arranged such that when the second lower punch 31 pushes the annular intermediate formed body 82 to the cassette 52 for the magnetic field orienting and forming section, cassette 52 for the magnetic field orienting and forming section receives the annular intermediate formed body 82, and when the annular preformed body 81 is pushed out by the annular intermediate formed body 82, the annular preformed body 81 is supplied to the second upper punch 32.

And, as shown in FIG. 20, the cassette 53 for the main forming section is so arranged as to hold the annular intermediate formed body 82 which will be subjected to the following main forming process, and advance to the position between the third upper punch 42 and the third lower punch 41, supply the annular intermediate formed body 82 to the third upper punch 42, receive the annular magnet 83 which has been subjected to the last main forming process, hold the annular magnet 83, and move back from the position between the third upper punch 42 and the third lower punch 41.

And, as shown in FIG. 20, the cassette 53 for the main forming section is arranged such that when the third lower punch 41 pushes the annular magnet 83 to the cassette 53 for the main forming section, cassette 53 for the main forming section receives the annular magnet 83, and when the annular intermediate formed body 82 is pushed out by the annular magnet 83, this annular intermediate formed body 82 is supplied to the third upper punch 42.

And, as shown in FIG. 12, the cassette 52 for the magnetic field orienting and forming section has a work holding hole 521 adapted for inserting the annular preformed body 81 and the annular intermediate formed body 82 therein and holding the same.

And, as shown in FIG. 20, the cassette 53 for the main forming section also has a work holding hole 531 adapted for inserting the annular magnet 83 therein and holding the same.

And, as shown in FIGS. 12, 20, the depth of the work holding hole 521 is made approximately equal to the thickness of the annular preformed body 81 or greater than the thickness of the annular preformed body 81. And the depth of the work holding hole 531 is made approximately equal to the thickness of the annular intermediate formed body 82 or greater than the thickness of the annular intermediate formed body 82. And the cassettes 52, 53 can transfer the preformed body 81, intermediate formed body 82 or annular magnet 83 which have been inserted in the work holding holes 521, 531, and can protect the preformed body 81, intermediate formed body 82 or annular magnet 83 to prevent cracks, damages or the like from being formed in outer peripheral surfaces thereof.

And, as shown in FIGS. 12, 20, magnets 522, 532 are respectively disposed in the work holding holes 521, 531 of the cassette 52 for the magnetic field orienting and forming section and the cassette 53 for the main forming section. And the cassettes 52, 53 are respectively arranged such that the magnets 522, 532 attract the preformed body 81 and the intermediate formed body 82, or the annular magnet 83 and hold the same.

And, as described above, the second die 35 in the magnetic field orienting and forming section 3 and the third die 45 in the main forming section 4 are in the heated condition with the heating means 37 and 46. Accordingly, it is preferable that arm parts 523, 533 (see FIG. 11, FIG. 19) of the cassettes 52, 53 are composed of a material which is not considerably affected by heat. In addition, by providing cooling means such as cooling fans or radiating fins in the arm parts 523, 533, the effect of heat can be protected.

And, it is preferable that the work holder 321 in the magnetic field orienting and forming section 3 and the work holder 421 in the main forming section 4 are composed of a material which is not considerably affected by heat. In addition, the work holders 321, 421 may be cooled with cooling means.

(Buffer Section)

As shown in FIGS. 2, 26, the device 1 for producing an annular magnet in the present embodiment has a buffer section 54 for temporarily storing the annular intermediate formed body 82 in the position between the cassette 52 for the magnetic field orienting and forming section and the cassette 53 for the main forming section. The annular intermediate formed body 82 formed in the magnetic field orienting and forming section 3 is temporarily stored in the buffer section 54, and is carried in the main forming section 4.

As described above, with the present embodiment, by virtue of the buffer section 54, the stroke of the loader cassette 55 upon transferring the preformed body 81, the intermediate formed body 82 and the annular magnet 83 can be decreased. As a result, works can be transferred from the cassette 52 for the magnetic field orienting and forming section to the buffer section 54, from the buffer section 54 to the cassette 53 for the main forming section, and from the cassette 53 for the main forming part to the unloading section 77 by merely reciprocating one loader cassette 55 without increasing the dimensions of the device 1.

And the buffer section 54 has a buffer holding hole 541 for inserting and holding the annular intermediate formed body 82. A magnet (not shown) is disposed in this buffer holding hole 541. And this buffer section 54 is arranged such that the magnet attracts the annular intermediate formed body 82 and holds the same.

(Loader Cassette)

Next, the loader cassette 55 will be explained in detail.

As shown in FIGS. 2, 26, the loader cassette 55 has loader holding holes. 551 through 553 for inserting the preformed body 81, intermediate formed body 82 or annular magnet 83 and holding the same, similarly to the cassettes 52, 53. And the loader cassette 55 of the present embodiment has the first loader holding hole 551 for receiving the annular intermediate formed body 82 from the cassette 52 for the magnetic field orienting and forming section, and transferring the same to the buffer section 54, the second loader holding hole 552 for receiving the annular intermediate formed body 82 from the buffer section 54 and delivering the same to the cassette 53 for the main forming section, and the third loader holding hole 553 for receiving the annular magnet 83 from the cassette 53 for the main forming section and delivering the same to the unloading section 77.

And, as shown in FIG. 26, a magnet (not shown) is disposed in each of the first through third loader holding holes 551 through 553 in the loader cassette 55. And the loader cassette 55 is arranged such that each magnet attracts the preformed body 81, intermediate formed body 82 or annular magnet 83 to hold the same.

(Work Shifting Section)

As shown in FIGS. 11, 19, 26, the device 1 for producing an annular magnet in the present embodiment has a work placing section 7 which is capable of shifting works, that is the preformed body 81, intermediate formed body 82 or annular magnet 83, between the cassette 52 for the magnetic field orienting and forming section, the cassette 53 for the main forming section, buffer section 54 and loader cassette 55.

This work shifting section 7 has the following first through sixth shifting pins 71 through 76. By moving these shifting pins 71 through 76, the works 81 through 83 can be shifted.

Namely, as shown in FIG. 26, the first shifting pin 71 is adapted to shift the annular intermediate formed body 82 which is held in the work holding hole 521 in the cassette 52 for the magnetic field orienting and forming section to the first loader holding hole 551 in the loader cassette 55.

And, the second shifting pin 72 is adapted to shift the annular intermediate formed body 82 which is held in the buffer holding hole 541 in the buffer section 54 to the second loader holding hole 552 in the loader cassette 55. And the third shifting pin 73 is adapted to shift the annular intermediate formed body 82 which is held in the first loader holding hole 551 in the loader cassette 55 to the buffer holding hole 541 in the buffer section 54.

And, as shown in FIG. 26, the fourth shifting pin 74 is adapted to shift the annular magnet 83 which is held in the work holding hole 531 in the cassette 53 for the main forming section to the third loader holding hole 553 in the loader cassette 55. And, the fifth shifting pin 75 is adapted to shift the annular intermediate formed body 82 which is held in the second holding hole 552 in the loader cassette 55 to the work holding hole 531 in the cassette 53 for the main forming section.

And the sixth shifting pin 76 is adapted to unload the annular magnet 83 that is held in the third holding hole 553 in the loader cassette 55 to the unloading section 77.

And, as shown in FIGS. 26 through 30, the loader cassette 55 is capable of reciprocating between a receiving position 555 in which the works 81 through 83 composed of the preformed body 81, intermediate formed body 82 and magnet 83 are received, and a delivery position 556 in which the works 81 through 83 are delivered.

Figure 27:
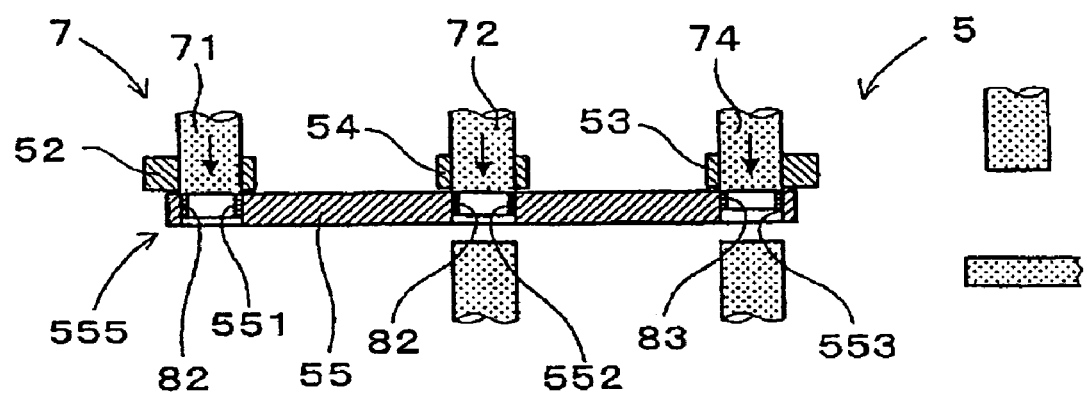
FIG. 27 is a diagram showing the state where a loader cassette of the embodiment 1 respectively receive works from the cassette for the magnetic field orienting and forming section, the cassette for the main forming section, and a buffer section.

And, as shown in FIG. 27, the loader cassette 55 located in the receiving position 555 is so arranged as to receive the annular intermediate formed body 82 from the cassette 52 for the magnetic field orienting and forming section with the operation or the first shifting pin 71, receive the annular intermediate formed body 82 from the buffer section 54 with the operation of the second shifting pin 72, and receive the annular magnet 83 from the cassette 53 for the main forming section with the operation of the fourth shifting pin 74.

Figure 29:
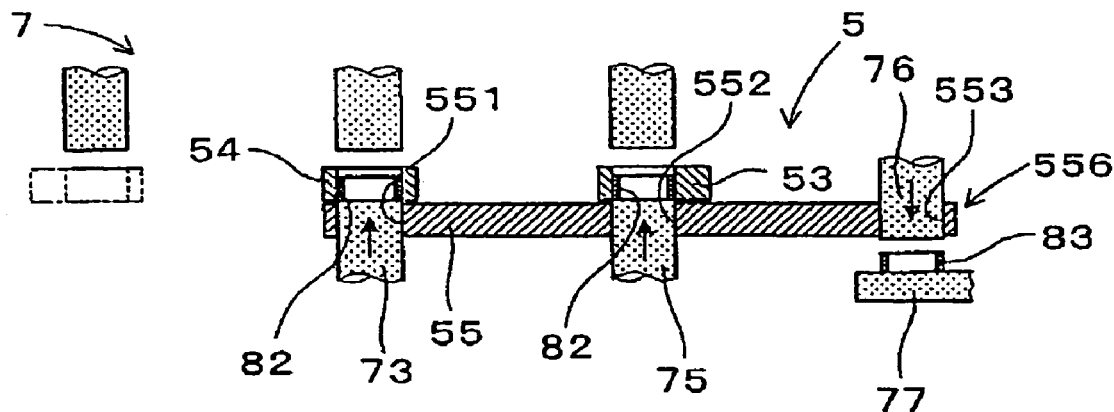
FIG. 29 is a diagram showing the state where the loader cassette of the embodiment 1 delivers works to the cassette for the magnetic field orienting and forming section, the cassette for the main forming section, and a unloading section.

On the other hand, as shown in FIG. 29, the loader cassette 55 located in the delivery position 556 is so arranged as to deliver the annular intermediate formed body 82 from the loader cassette 55 to the buffer section 54 with the operation of the third shifting pin 73, deliver the annular intermediate formed body 82 from the loader cassette 55 to the cassette 53 for the main forming section with the operation of the fifth shifting pin 75, and unload the annular magnet 83 from the loader cassette 55 to the unloading section 77.

(Preforming Method)

Next, the method for preforming in the preforming section 2 will be explained.

As shown in FIG. 1, in the preforming section 2, the rubbing jig 281 which holds the compound 80 is advanced upwardly of the first lower punch 21 and the first core 23. At this time, due to the advance of the rubbing jig 281, the annular preformed body 81 formed before, can be moved to the prescribed transfer position.

Figure 5:
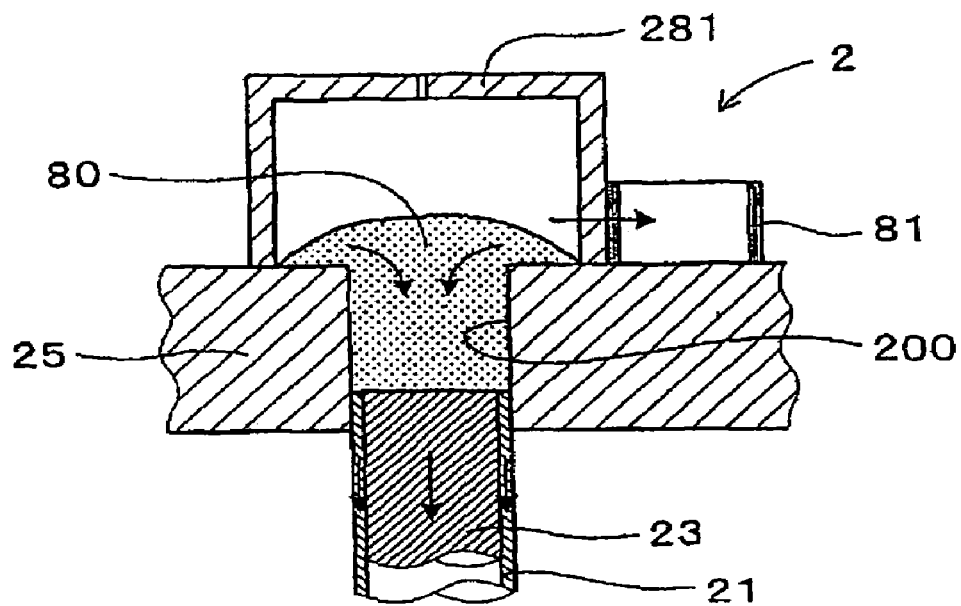
FIG. 5 is a diagram showing the state where a charging space of the preforming section is charged with a compound.

And, as shown in FIG. 5, the first lower punch 21 and the first core 23 are lowered relative to the first die 25 with the rubbing jig 281 disposed above the first lower punch 21 and the first core 23, thereby defining a charging space 200 with a volume greater than the annular cavity 20, and the charging space 206 is charged with the compound 80.

Next, as shown in FIG. 6, the first lower punch 21 and the first core 23 are elevated relative to the first die 25, thereby defining the annular cavity 20 charged with the compound 80. And an excess compound 80 is discharged outwardly of this annular cavity 20. And the rubbing jig 281 holding the compound 80 is moved back to its original position (see FIG. 1).

Figure 7:
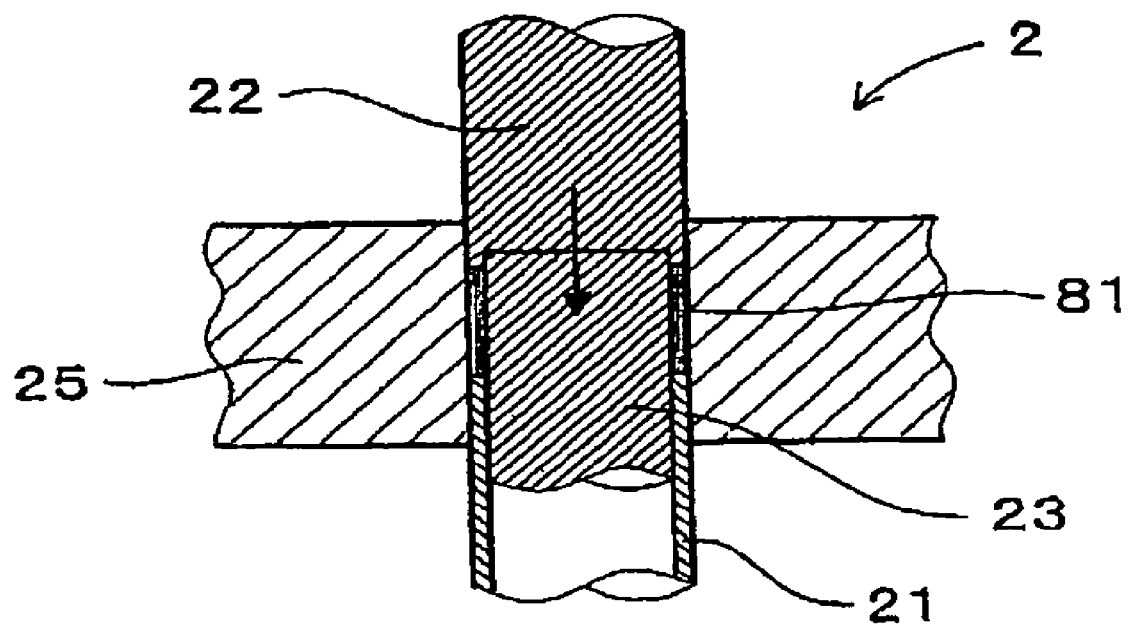
FIG. 7 is a diagram showing the state where the compound is pressure-formed with a first upper punch and a first lower punch in the preforming section to form an annular preformed body.

Then, as shown in FIG. 7, the first upper punch 22 is lowered to compress the compound 80 in the annular cavity 20 between the first upper punch 22 and the first lower punch 21, thereby forming the annular preformed body 81.

And, this compression forming can be preformed by lowering the first core 23 along with the first upper punch 22, and applying a pressure to the compound 80 while lowering the first core 23 and the first upper punch 22 together. Upon compression forming, the servomotor 24 is controlled to apply an elevation thrust in the direction of the first upper punch 22 to the first core 23, and with the lowering thrust of the first upper punch 22, which is greater than this elevation thrust, the first core 23 can be lowered, following the first upper punch 22.

And, the first lower punch 21 is raised to extract the annular preformed body 81 from the first die 25. Then, the rubbing jig 281 can be advanced again, similarly to the above-described case. After that time, the annular preformed body 81 can be repeatedly formed from the compound 80, similarly.

And, as shown in FIGS. 2, 4, the annular preformed body 81 which is moved to the prescribed transfer position is transferred to the mass measuring means 26 with the transfer bar 27. Upon transferring, the transfer bar 27 transfers the annular preformed body 81 to the position before reaching the mass measuring means 26, and temporarily stops transferring. And the mass measuring means 26 performs the zero amendment to reset the value of the mass at the present time.

After the zero amendment, the transfer bar 27 is started again to transfer the annular preformed body 81 from the temporarily stopped position to the mass measuring means 26.

Then, the mass measuring means 26 measures the mass of annular preformed body 81, and judges whether the measured mass value is within the scope of the mass values of good products or not.

And when the measured mass value is within the scope of the mass values of good products, the annular preformed body 81 that is judged good is transferred to the lubricant oil impregnating section 6 by means of the transfer robot 51. On the other hand, when the measured mass value is beyond the scope of the mass values of good products, the mass measuring means 26 judges the annular preformed body 81 inferior, and removes the same from the production line by means of the transfer robot 51. And the annular preformed body 81 that is judged inferior is not transferred to the lubricant oil impregnating section 6, and can be used again as the compound 80 after crushing.

And, in the present embodiment, the control means monitors the measured mass values of the mass measuring means 26, and the measured mass values are feedback to the preformed section 2, and reflected therein. Namely, the first lower punch 21 in the preforming section 2 can vary the position before the pressure-forming (compression forming) based on the measured mass values when the mass measuring means 26 judges inferior continuously or frequently.

More specifically, as shown in FIG. 6, when the annular preformed body 81 with masses greater than the mass values of good products are formed continuously or frequently, the volume of the annular cavity 20 can be decreased by varying the position of the first lower punch 21 before the pressure-forming to the position shallower than the present position. On the other hand, when the annular preformed body 81 with masses less than the mass values of good products are formed continuously or frequently, the volume of the annular cavity 20 can be increased by varying the position of the first lower punch 21 before the pressure-forming to the position deeper than the present position.

The above-described variation of the mass of the annular preformed body 81 is considered to be caused by the variation of the easiness of charging the annular cavity 20 with the compound 80, which is due to the difference in every rod of compound 80.

As described above, in the preforming section 2, the volume of the annular cavity 20 can be arbitrarily changed based on the mass value measured with the mass measuring means 26, and consequently, production of a large number of inferior preformed bodies 81 can be restrained.

(Lubricant Oil Impregnation Method)

Next, the method for impregnating a lubricant oil 65 in the lubricant oil impregnating section 6 will be explained.

As shown in FIGS. 2, 4, the transfer robot 51 transfers the annular preformed body 81 which has been judged good from the mass measuring means 26 to the lubricant oil impregnating section 6.

Namely, as shown in FIG. 8, one work attracting section 511 of the transfer robot 51 attracts the preformed body 81 that has been judged good, and transfers the same to the impregnation jig 60 of the lubricant oil impregnating section 6. And when the transfer robot 51 comes near the impregnation jig 60, another work attracting section 512 attracts the annular preformed body 81 which has been impregnated with a lubricant oil 65 at the preceding time, and extracts the same out of the impregnation jig 60.

And, as shown in FIG. 8, the lubricant oil 65 is fed into the impregnation jig 60 with the lubricant oil feeding means 63, and then, the annular preformed body 81 attracted on the one work attracting section 511, which has not been impregnated with the lubricant oil, is inserted in the impregnation jig 60. At this time, the lubricant oil 65 permeates an entire part of the annular preformed body 81.

And, as shown in FIG. 9, the lubricant oil 65 with which the annular preformed body 81 has been impregnated in the impregnation jig 60 is sucked with the sucking means 64 for a prescribed period of time, thereby sucking an excess amount of lubricant oil 65 from this annular preformed body 81. Thus, an entire part of the annular preformed body 81 can be impregnated with a required and sufficient amount of lubricant oil 65 approximately homogeneously.

(Magnetic Field Orienting and Forming Method)

Next, the method for preforming the magnetic field orienting and forming in the magnetic field orienting and forming section 3 will be explained.

As shown in FIGS. 1, 2, 11, 12, in the magnetic field orienting and forming section 3, the annular preformed body 81 is transferred with the cassette 52 for the magnetic field orienting and forming section.

Figure 16:
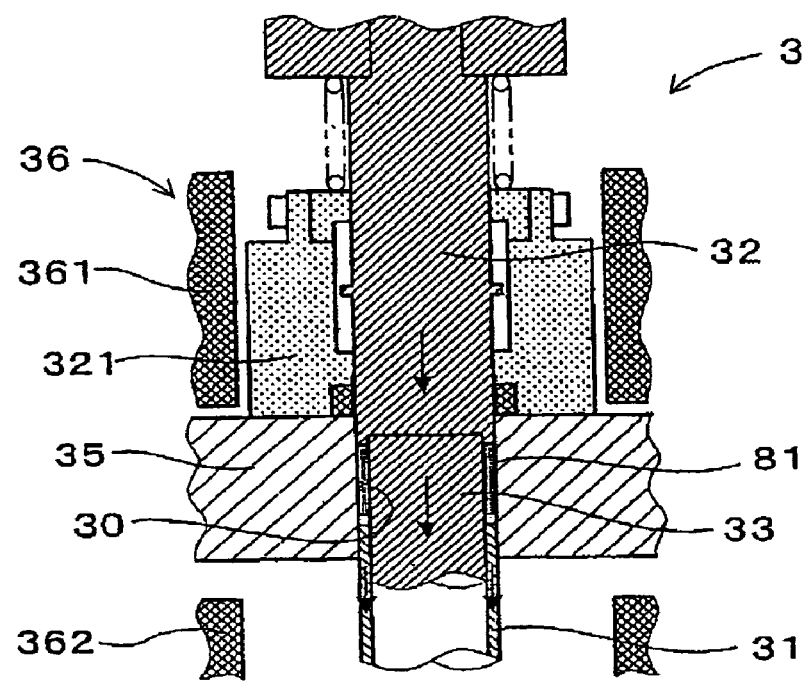
FIG. 16 is a diagram showing the state where the annular preformed body is entirely inserted in a second die in the magnetic field orienting and forming section of the embodiment 1.

And as shown in FIG. 16, this annular preformed body 81 is disposed in the second annular cavity 30 defined by the second die 35, second core 33 and second lower punch 31.

At this time, the interior of the second die 35 is heated to a prescribed temperature with the second heating means 37. Therefore, the annular preformed body 81 disposed in the second annular cavity 30 is heated, and thermosetting resin in this annular preformed body 81 melts to form the state in which a large number of anisotropic magnet powder can rotate and move.

And, as shown in FIG. 16, the second pressure sub-table 303 is lowered by the cylinder 304 to set the upper magnetic field coil 361 near the upper part of the second die 35.

Then, as shown in FIG. 17, an electric current is supplied to the upper magnetic field coil 361 and the lower magnetic field coil 362 to generate a radial magnetic field which is directed towards an axial center of the second die 35 from the upper side and the lower side thereof, and radially flows from the axial center of the second die 35 in directions of a circumference thereof. In this drawing, the magnetic line of force in this radial magnetic field is designated by the reference character "M".

Each anisotropic magnet powder in the annular preformed body 81 held in the second annular cavity 30 rotates and moves in the thermosetting resin due to the operation of the radial magnetic field so as to be oriented radially in the directions of the circumference of the second annular cavity 30. Consequently, the magnetization facilitating axis (direction in which magnetization is facilitated) of each anisotropic magnet powder is arranged radially in the directions of the circumference of the second annular cavity 30, whereby the orientation of the magnetic field in radial directions is prefomed. And the second upper punch 32 is lowered with the magnetic field thus oriented to catch and compress the annular preformed body 81 in a melted state between the second upper punch 32 and the second lower punch 31, thereby forming the annular intermediate formed body 82. In FIG. 17, the load due to the second upper punch 32 is designated by P.

After forming the annular intermediate formed body 82 in the magnetic field orienting and forming section 3, the annular intermediate formed body 82, second die 35, second upper punch 32, second lower punch 31, second core 33 and the like are magnetized, because an electric current is supplied to the pair of upper and lower magnetic field coils 361 and 362 to perform the magnetic field orientation.

Therefore, after forming the annular intermediate formed body 82, an electric current is supplied in an opposite direction to the case where an electric current has been supplied upon orienting the magnetic field of the pair of upper and lower magnetic coils 361 and 362. And a magnetic field which is radially directed from the sides of the second die 35 towards an axial center thereof, and flows from the axial center of the second die 35 and diverges upwardly and downwardly, whereby the annular intermediate formed body 82 and the second die 35 and the second upper punch 32, the second lower punch 31, the second core 33 and the like are demagnetized.

(Main Forming Method)

As shown in FIGS. 1, 2, 19, 20, in the main forming section 4, the annular intermediate formed body 82 is transferred with the cassette 53 for the main forming section.

Figure 21:
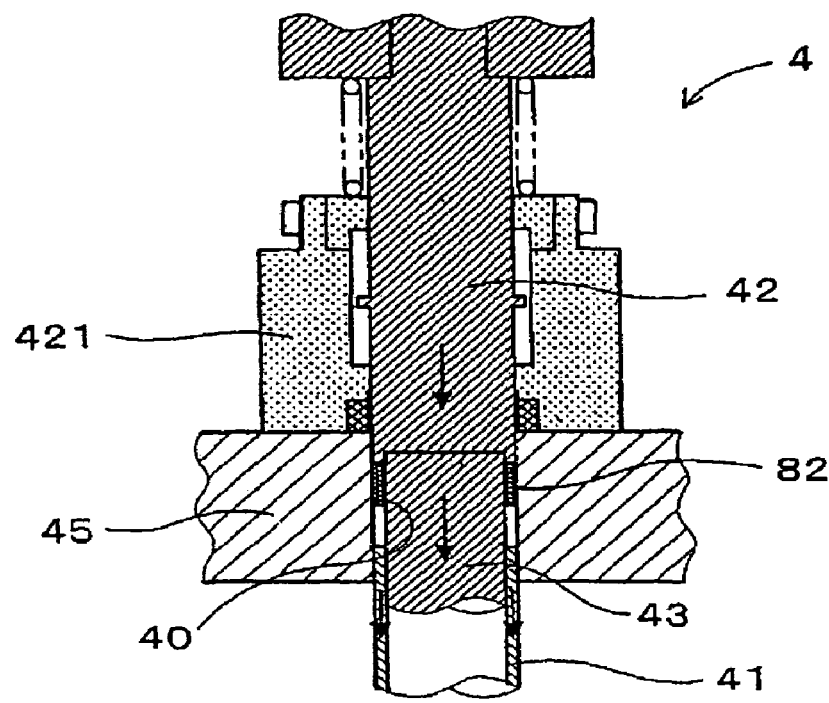
FIG. 21 is a diagram showing the state where the annular intermediate formed body is entirely inserted in a third die in the main forming section of the embodiment 1.

And as shown in FIG. 21, this annular intermediate formed body 82 is disposed in a third annular cavity 40 defined by the third die 45, third core 43 and third lower punch 41.

At this time, the interior of the third die 45 is heated to a prescribed temperature with the third heating means 46. Therefore, the annular intermediate formed body 82 disposed in the third annular cavity 40 is heated, and thermosetting resin in this annular intermediate formed body 82 melts again. It is unnecessary that this melted state is a completely melted state. A half melted state where the thermosetting resin is melted to some degree will do.

In addition, the heating temperature of the third heating means 46 in the main forming section 4 is set higher than the heating temperature of the second heating means 37 in the magnetic field orienting and forming section 3.

And, as shown in FIG. 22, the third upper punch 42 is lowered to catch and compress the annular intermediate formed body 82, which is in the above-described melted state between the third upper punch 42 and the third lower punch 41. This compression is performed by increasing the pressure force of the third upper punch 42 greater than the pressure force of the second upper punch 32 in the magnetic field orienting and forming section 3. Thus, the annular intermediate formed body 82 is further compressed to form the annular magnet 83.

(Cassette Transferring Method)

Next, the method of carrying the annular preformed body 81 in and out with the cassette 52 for the magnetic field orienting and forming section will be explained.

As shown in FIGS. 2, 11, the transfer robot 51 transfers the annular preformed body 81 after impregnation with a lubricant oil from the lubricant oil impregnating section 6 to the cassette 52 for the magnetic field orienting and forming section.

And, as shown in FIG. 12, the cassette 52 for the magnetic field orienting and forming section, which receives the annular preformed body 81 from this transfer robot 51 holds the annular preformed body 81 in its work holding holes 521 and carries the same in the position between the second upper punch 32 and the second lower punch 31.

Figure 13:
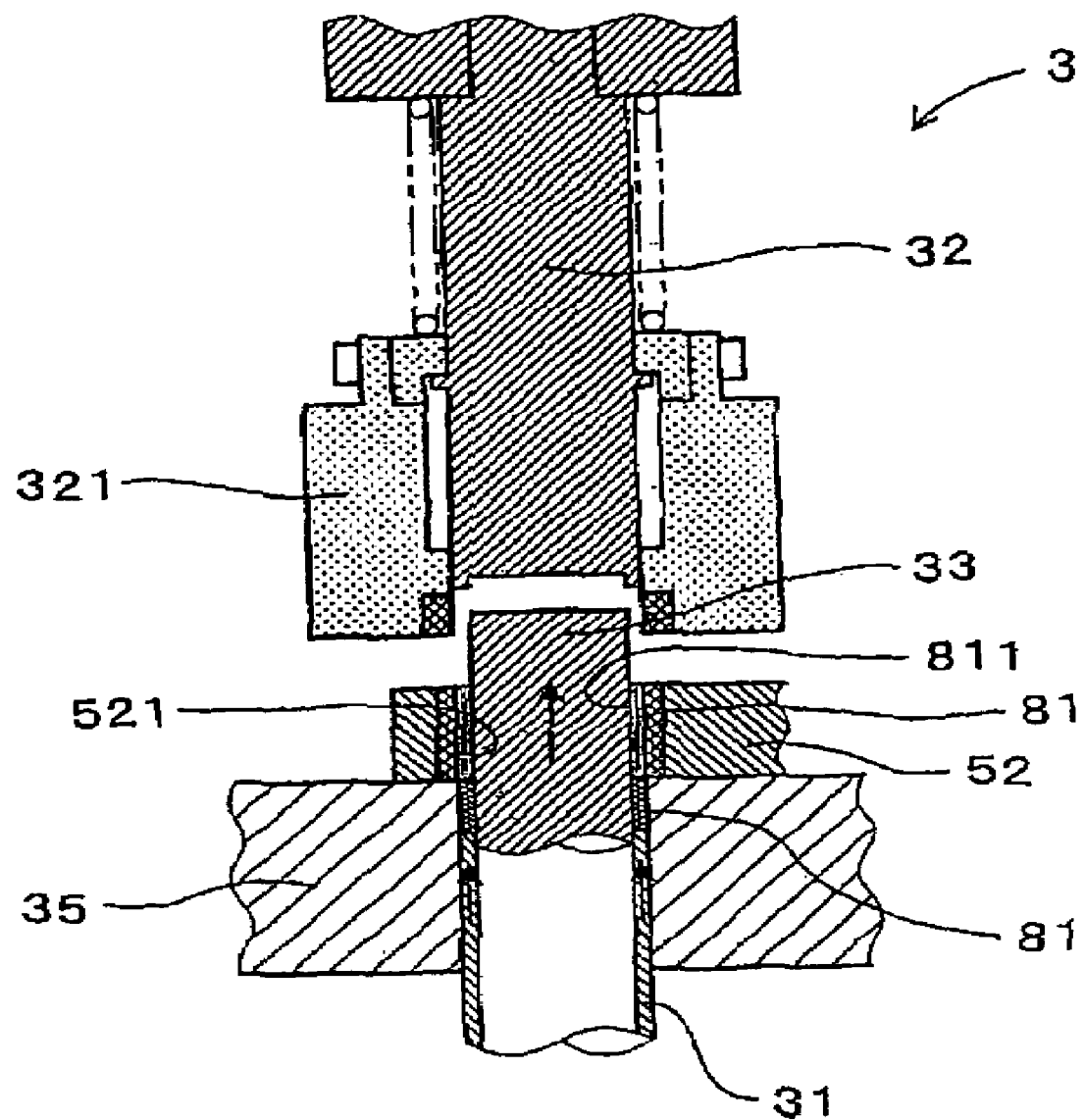
FIG. 13 is a diagram showing the state where the second lower punch and a second core are elevated while the second upper punch is lowered in the magnetic field orienting and forming section of the embodiment 1.

And, as shown in FIG. 13, the second upper punch 32 is lowered with the work holding hole 521 of the cassette 52 for the magnetic field orienting and forming section positioned between the second upper punch 32 and the second lower punch 31, and the second core 33 is inserted in a hole 811 of the preformed body 81 which is held by the cassette 52 for the magnetic field orienting and forming section.

And, as shown in FIG. 14, the second lower punch 31 is elevated with the hole 811 of the annular preformed body 81 held by the second core 33.

At this time, unloading of the annular intermediate formed body 82 to the cassette 52 for the magnetic field orienting and forming section is performed by pushing the annular intermediate formed body 82 out in the work holding hole 521 of the cassette 52 for the magnetic field orienting and forming section with the second lower punch 31. As a result, the cassette 52 for the magnetic field orienting and forming section can receive the annular intermediate formed body 82 in its work holding hole 521 with the elevation of the second lower punch 31.

And, at this time, the annular preformed body 81 is taken out from the cassette 52 for the magnetic filed orienting and forming section and supplied to the second upper punch 32 by pushing the annular preformed body 81 with the annular preformed body 82 out of the work holding hole 521. And, the cassette 52 for the magnetic filed orienting and forming section inserts the annular intermediate formed body 82 in the holder holding section 322 of the work holder 321 provided in the second upper punch 32 and can supply the same to the second upper punch 32.

And, in the second upper punch 32, the annular preformed body 81 can be held with the magnet 323 provided in the work holder 321 without dropping from the second upper punch 32 (see FIG. 15).

In this manner, the change of the annular preformed body 81 and the annular intermediate formed body 82 for the cassette 52 for the magnetic field orienting and forming section can be performed with the elevating movement of the second lower punch 31. And, the unloading of the annular intermediate formed body 82 to the cassette 52 for the magnetic field orienting and forming section, removal of the annular preformed body 81 from the cassette 52 for the magnetic field orienting and forming section and supply thereof to the second upper punch 32 can be performed with only the elevating movement of the second lower punch 31 approximately simultaneously.

Next, as shown in FIG. 15, by lowering the second core 33 and second lower punch 31 and elevating the second upper punch 32, the annular intermediate formed body 82 is carried from the position between the second upper punch 32 and the second lower punch 31 by means of the cassette 52 for the magnetic field orienting and forming section.

Then, as shown in FIGS. 16, 17, the magnetic field orienting and forming is performed in the magnetic field orienting and forming section 3, and the cassette 52 for the magnetic field orienting and forming section carries the annular intermediate formed body 82 out of the magnetic field orienting and forming section 3 at the time when the magnetic field orienting and forming are performed in the magnetic field orienting and forming section 3.

In the present embodiment, the carrying method by the cassette 52 for the magnetic field orienting and forming section has been explained. The carrying method by the cassette 53 for the main forming section is similar thereto.

(Loader Transfer Method)

Hereinafter, the flow of transferring works with the cassette 52 for the magnetic field orienting and forming section, cassette 53 for the main forming section, loader cassette 55 and first through sixth shifting pins 71 through 76 will be explained.

Figure 23:
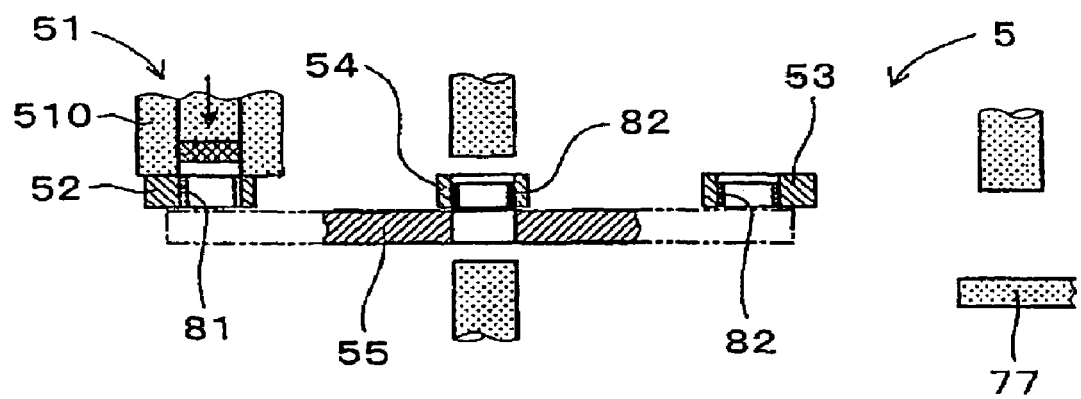
FIG. 23 is a diagram showing the state where the transfer robot of the embodiment 1 transfers works to the cassette for the magnetic field orienting and forming section, and the cassette for the main forming section carries the works out of the device 1.

As shown in FIG. 23, the annular preformed body 81 is transferred to the cassette 52 for the magnetic field orienting and forming section from the transfer robot 51. And the cassette 53 for the main forming section carries the annular magnet 83 out of the main forming section 4. At this time, the buffer section 54 holds the annular intermediate formed body 82.

Figure 24:
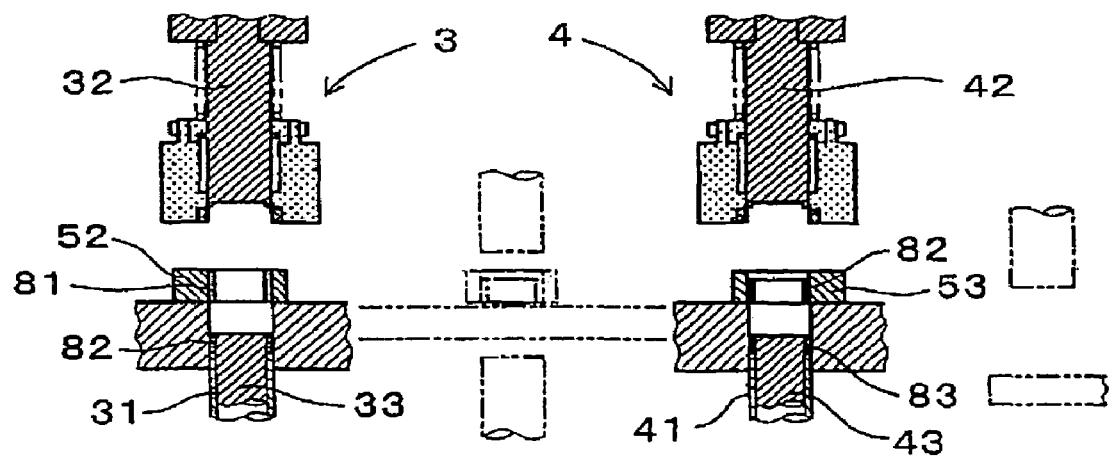
FIG. 24 is a diagram showing the state where the cassette for the magnetic field orienting and forming section and the cassette for the main forming section of the embodiment 1 respectively carry works in the magnetic field orienting and forming section and the main forming section.

Next, as shown in FIG. 24, the cassette 52 for the magnetic field orienting and forming section carries the annular preformed body 81 in the magnetic field orienting and forming section 3 and the cassette 53 for the main forming section carries the annular intermediate formed body 82 in the main forming section 4.

Figure 25:
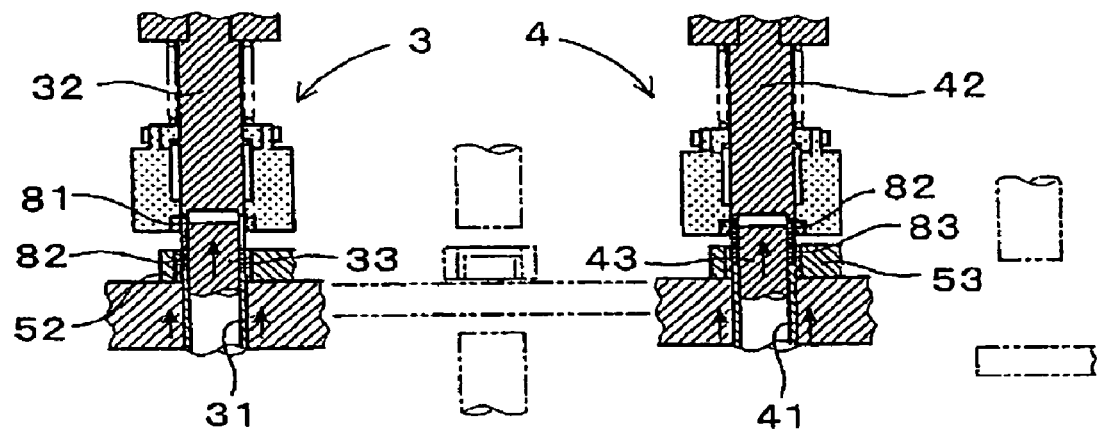
FIG. 25 is a diagram showing the state where the change of the works is performed in the cassette for the magnetic field orienting and forming section and in the cassette for the main forming section in the magnetic field orienting and forming section and the main forming section of the embodiment 1.

Next, as shown in FIG. 25, in the magnetic field orienting and forming section 3, change of the annular preformed body 81 and the annular intermediate formed body 82 is performed for the cassette 52 for the magnetic field orienting and forming section. And in the main forming section 4, the change of the annular intermediate formed body 82 and the annular magnet 83 is performed for the cassette 53 for the main forming section.

Then, as shown in FIG. 26, the cassette 52 for the magnetic field orienting and forming section carries the annular intermediate formed body 82 out of the magnetic field orienting and forming section 3, and the cassette 53 for the main forming section carries the annular magnet 83 out of the main forming section 4.

Next, as shown in FIG. 27, the first shifting pin 71 shifts the annular intermediate formed body 82 from the cassette 52 for the magnetic field orienting and forming section to the first loader holding hole 551 of the loader cassette 55 located in the receiving position 555, the second shifting pin 72 shifts the annular intermediate formed body 82 from the buffer section 54 to the second loader holding hole 552 of the loader cassette 55, and the fourth shifting pin 74 shifts the annular magnet 83 from the cassette 53 for the main forming section to the third loader holding hole 553 of the loader cassette 55.

Figure 28:
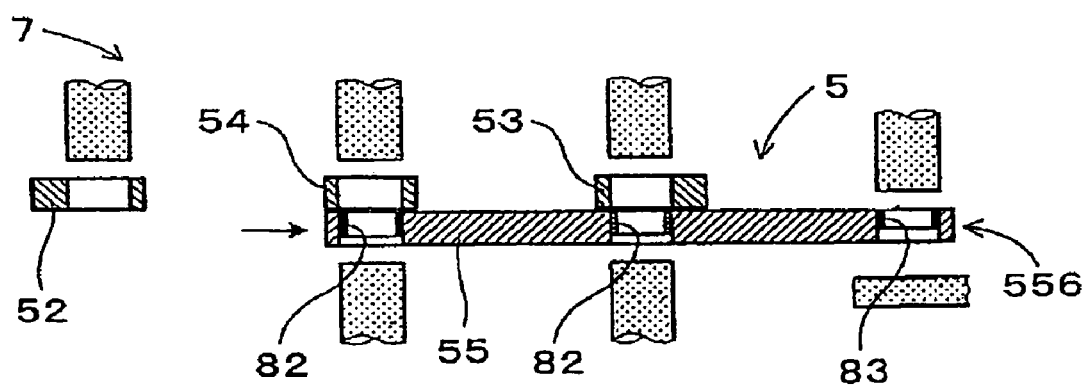
FIG. 28 is a diagram showing the state where the loader cassette is fed out in the embodiment 1.

Then, as shown in FIG. 28, the loader cassette 55 is sent to the delivering position 556 from the receiving position 555.

Next, as shown in FIG. 29, in the state where the loader cassette 55 is located in the delivering position 556, the third shifting pin 73 shifts the annular intermediate formed body 82 from the first loader holding hold 551 of the loader cassette 55 to the buffer section 54, the fifth shifting pin 75 shifts the annular intermediate formed body 82 from the second loader holding hole 552 of the loader cassette 55 to the cassette 53 for the main forming section, and the sixth shifting pin 76 unloads the annular magnet 83 from the third loader holding hole 553 of the loader cassette 55 to the unloading section 77.

Figure 30:
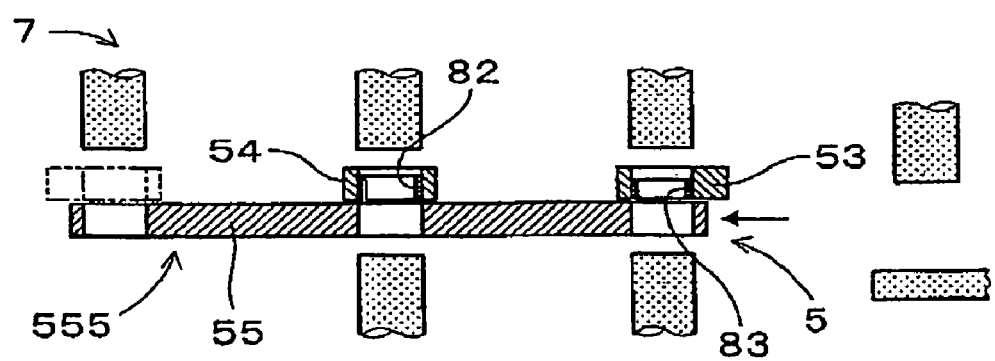
FIG. 30 is a diagram showing the state where the loader cassette is returned in the embodiment 1.

Then, as shown in FIG. 30, the loader cassette 55 is returned from the delivering position 556 to the receiving position 555. The above-described operations are repeated, similarly, thereby performing the continuous work transfer operation.

(Operational Advantage of the Producing Device)

In the preforming section 2, the space 200 with a volume greater than that of the annular cavity 20 is temporarily charged with the compound 80, and an excess amount of compound 80 is discharged to carry out the discharging of the annular cavity 20 with the compound 80. With this method, the charging amount of the compound 80 can be stabilized.

And, in the preforming section 2, the compound 80 is compressed by lowering the first upper punch 22 and the first core 23 while linking with each other. Therefore, the compound 80 can be compressed approximately homogeneously, whereby the annular preformed body 81 of which the density does not locally scatter greatly can be formed.

In addition, in the preforming section 2, the mass of all of the annular preformed bodies 81 can be measured with the mass measuring means 26. And, only when the mass of the annular preformed body 81 is within the range of mass values of good products, the annular preformed body 81 can be transferred to the following magnetic field orienting and forming section 3 with the work transferring section 5. On the other hand, when the mass of the annular preformed body 81 is out of the range of mass values of good products, the annular preformed body 81 can be stopped from being transferred to the following magnetic field orienting and forming section 3. Accordingly, only the annular preformed body 81 that has been judged good by the mass measuring means 26 is supplyed to the magnetic field orienting and forming section 3, whereby the mass of the annular preformed body 81 to be supplyed to the magnetic field orienting and forming section 3 can be stabilized.

In addition, the annular preformed body 81 which has been judged inferior can be reused as the compound 80 after being broken outside of the device 1. Therefore, the compound 80 is scarcely wasted, thereby improving the yield in the device 1.

And, the first lower punch 21 in the preforming section 2 can vary its position prior to the compression forming based on the mass of the annular preformed body 81, which has been measured with the mass measuring means 26. Therefore, when the mass measuring means 26 continuously or frequently judges inferior, the volume of the annular cavity 20 can be arbitrarily varied by varying the position of the first lower punch 21 prior to the pressure-forming. Consequently, the mass of the annular preformed body 81 to be supplyed to the magnetic field orienting and forming section 3 can be further stabilized.

In addition, in the magnetic field orienting and forming section 3, the annular intermediate formed body 82 can be formed from the annular preformed body 81 of which the mass is stabilized, and which contains the anisotropic magnet powder with a stabilized content Accordingly, when the annular preformed body 81 is subjected to the magnetic field orientation and forming, the annular intermediate formed body 82 can be formed with the content of anisotropic magnet powder stabilized. Consequently, when the annular magnet 83 is formed from the annular intermediate formed body 82 in the main forming section 4, and magnetized to N pole and S pole, the annular magnet 83 with excellent magnet characteristics can be produced stably.

And, by forming the annular magnet 83 at a temperature higher than that in the preforming section 2, and under a pressure greater than that in the preforming section 2, in the main forming section 4, the annular magnet 83 with an excellent dimensional accuracy can be formed.

Therefore, with the device 1 for producing the annular magnet, the annular magnets 83 of which the masses are stabilized, and which are excellent in dimensional accuracy and magnet performance can be produced repeatedly.

And the position, pressure applying rate, pressure force or the like of all the upper punches 22, 32, 42, lower punches 21, 31, 41 and cores 23, 33, 43 in the preforming section 2, magnetic field orienting and forming section 3 and main forming section 4 are controllable by means of the servomotors 24, 34 and 44. Accordingly, by controlling the servomotors 24, 34, 44, the position of each of the upper punches 22, 32, 42, lower punches 21, 31, 41 and cores 23, 33, 43 can be finely adjusted, and the pressure applying rate, pressure force or the like thereof can be also adjusted.

Accordingly, the forming conditions in the preforming section 2, magnetic field orienting and forming section 3 and the main forming section 4 can be made most suitable, whereby the annular magnets 83 of which the scattering in mass can be further reduced, and of which the dimensional accuracy and magnet performance are further improved can be produced repeatedly.

Figure 31:
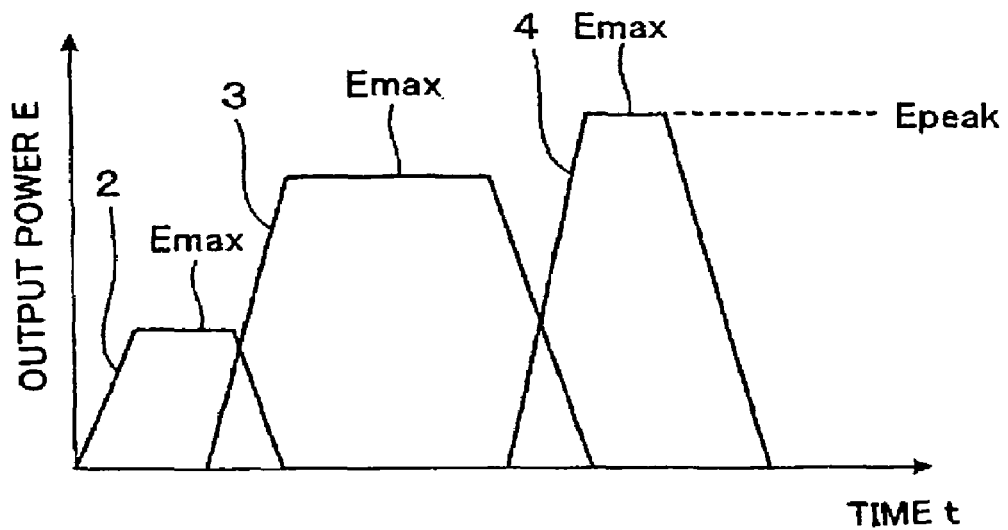
FIG. 31 is a schematic graph showing the generating state of a maximum output power in each section of the embodiment 1, of which abscissa is graduated by time, and ordinate is graduated by output power in each section.

And the device 1 is arranged such that the preforming section 2, magnetic field orienting and forming section 3 and the main forming section 4 respectively perform pressure-forming with different timings to restrain the generation of a peak electric power in the device 1. FIG. 31 diagrammatically shows the state in which the pressure-forming in each of the sections 2, 3, 4 is performed with different timings to generate a maximum electric power with different timings in the preforming section 2, magnetic field orienting and forming section 3 and the main forming section 4. FIG. 31 is a graph of which ordinate is graduated by time t while abscissa is graduated by output power E in each of the preforming section 2, magnetic field orienting and forming section 3 and the main forming section 4.

As shown in FIG. 31, in the present embodiment, the timing when the first upper punch 22, the first lower punch 21 and the first core 23 are moved by means of the servomotor 24 to perform pressure-forming in the preforming section 2, the timing when an electric current is supplied to a pair of upper and lower magnetic coils 361, 362 and the second upper punch 32, second lower punch 31 and second core 33 are moved by means of the servomotor 34 to perform pressure-forming in the magnetic field orienting and forming section 3, and the timing when the third upper punch 42, third lower punch 41 and the third core 43 are moved by the servomotor 44 to perform pressure-forming in the main forming section 4 are made different intentionally.

Therefore, the timing of generating a maximum output power Emax in each sections 2, 3, 4 can be scattered, and a peak power Epeak generated in the production device 1 was able to be decreased. And consequently, in spite of the fact that the device 1 has the above-described three sections 2, 3, 4, a maximum power supply capacity required for the device 1 can be decreased.

And by means of the cassette 52 for the magnetic field orienting and forming section, which can approximately simultaneously supply thee annular preformed body 81 to the second upper punch 32 and receive the annular intermediate formed body 82 from the second lower punch 31, the period of time required to carry the annular preformed body 81 into the magnetic field orienting and forming section 3 and carry the annular intermediate formed body 82 out of the magnetic field orienting and forming section 3 can be reduced.

And by means of the cassette 53 for the main forming section, which can approximately simultaneously supply the annular intermediate formed body 82 to the third upper punch 42 and receive the annular magnet 83 from the third lower punch 41, the period of time required to carry the annular intermediate formed body 82 into the main forming section 4 and carry the annular magnet 83 out of the main forming section 4 can be also reduced.

And, the transfer of works with the cassette 52 for the magnetic field orienting and forming section, the cassette 53 for the main forming section, and the loader cassette 55 can be performed while the magnetic field orienting and forming section 3 or the main forming section 4 performs pressure-forming. And, the preforming section 2, the magnetic field orienting and forming section 3 and the main forming section 4 can perform their operations simultaneously and continuously.

For these reasons, the period of time required for transferring works in the device 1 can be reduced, and the number of the annular magnets 83, which can be produced per unit production time, can be increased. And consequently, the device 1 for producing annular magnets with excellent productivity can be effected.

And, the transfer of works with the cassette 52 for the magnetic field orienting and forming section, the cassette 53 for the main forming section, and the loader cassette 55 can be performed with the preformed body 81, intermediate formed body 82 or annular magnet 83 inserted in the work holding holes 521, 531 or loader holding holes 551 through 553. Therefore, the transfer of works can be performed without braking or damaging the preformed body 81, intermediate formed body 82 or annular magnet 83.

And, in the device 1, forming of the annular preformed body 81, impregnation of the lubricant oil 65, forming of the annular intermediate formed body 82, and forming of the annular magnet 83 can be performed continuously, whereby the annular magnet 83 can be produced from the compound 80 continuously. And each of the preforming section 2, the magnetic field orienting and forming section 3 and the main forming section 4 is composed of an electric servo press using each of the servomotors 24, 34, 44. Accordingly, each of the sections 2, 3, 4 can be made compact, as compared with conventional electric crank type press or hydraulic press.

Therefore, the device 1 can be arranged compact although three sections 2, 3, 4 are included, and the annular magnet 83 can be produced from the compound 80 continuously.

Figure 32:
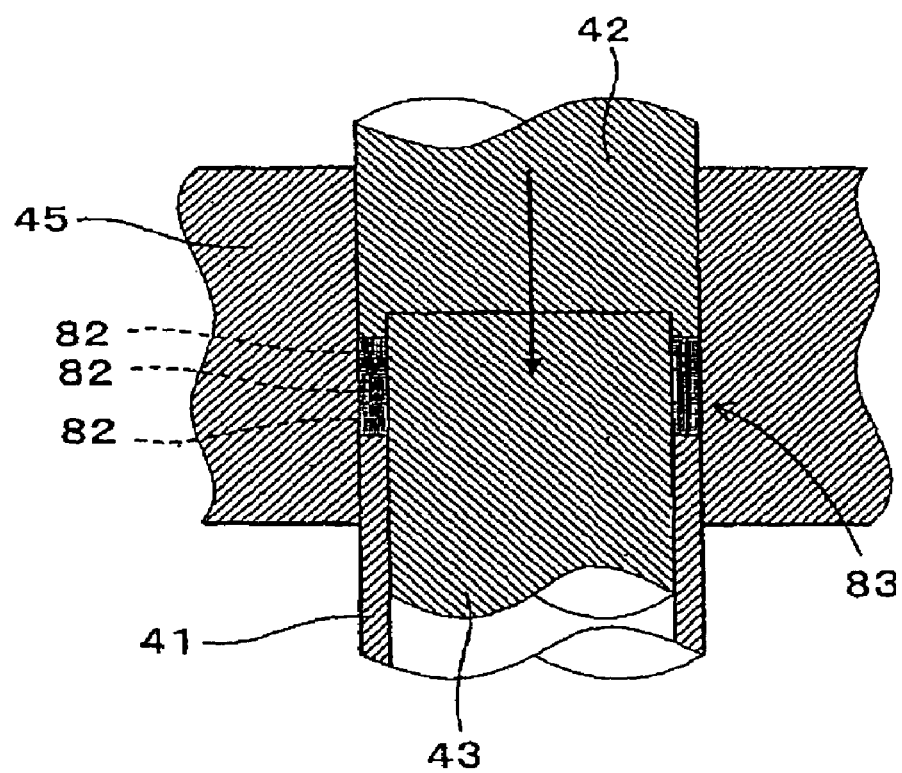
FIG. 32 is a diagram showing the state where the annular intermediate formed bodies which are piled up are pressure-formed with a third upper punch and a third lower punch in the main forming section of the embodiment 1 to mold an annular magnet.

And, as shown in FIG. 32, the device 1 can be also arranged such that a plurality of annular intermediate formed bodies 82 which have been formed in the magnetic field orienting and forming section 3 are stacked, and in the main forming section 4, the intermediate formed bodies 82 which are stacked into two or three layers, for example, are pressure-formed with the third upper punch 42 and the third lower punch 43.

In this case, even when the thickness (axial height) of the annular intermediate formed body 82 cannot be increased due to the restriction of the magnetic field applying means 36 in the magnetic field orienting and forming section 3, the annular intermediate formed bodies 82 are jointed to each other in an axial direction thereof by pressure-forming the annular intermediate formed bodies 82 which are stacked, in the main forming section 4, whereby annular magnets 83 with required thicknesses (axial heights) can be obtained.

Embodiment 2

As shown in FIGS. 33 through 39, a device 1A for producing an arcuate magnet of the present embodiment is the device by which a pair of arcuate magnets 83A (See FIG. 39) are produced from a compound 80 containing anisotropic magnet powder with two sections including a later-described preforming section 2A and a magnetic field orienting and forming section 3A.

Namely, the preforming section 2A of the present embodiment has a first die 25A defining an outer peripheral part of a pair of arcuate cavities 20A which face each other, a first core 23A defining an inner peripheral part of the cavities 20A, a first lower punch 21A defining a bottom wall of each cavity 20A, and a first upper punch 22A facing the first lower punch 21A.

And, the preforming section 2A is arranged such that the compound 80 prepared by mixing an anisotropic magnet powder and a thermosetting resin is charged in the above-described arcuate cavities 20A, and compression-forming is performed in the arcuate cavities 20A with the first upper punch 22A and the first lower punch 21A, thereby obtaining a pair of arcuate preformed bodies 81A.

And, the magnetic field orienting and forming section 3A of the present embodiment has a second die 35A for supporting an outer peripheral surface of each arcuate preformed body 81A, a second core 33A for supporting an inner peripheral surface of each arcuate preformed body 81A, a second lower punch 31A for supporting a bottom surface of each arcuate preformed body 81A, a second upper punch 32A facing the second lower punch 31A, magnetic field applying means 36A adapted to apply a magnetic field to the arcuate preformed body 81A, and heating means 37A adapted to heat the arcuate preformed body 81A.

And, the magnetic field orienting and forming section 3A heats the arcuate preformed body 81A with the heating means 37A, orienting the magnetic field of the anisotropic magnet powder in the arcuate preformed body 81A with the magnetic field applying means 36A with the thermosetting resin melted in the arcuate preformed body 81A, and at the same time, pressure is applied to the arcuate preformed body 81A with the second upper punch 32A and the second lower punch 31A, thereby obtaining a pair of arcuate magnets 83A.

In addition, the preforming section 2A has mass measuring means 26A for measuring the mass of the pair of arcuate preformed bodies 81A after forming thereof. And the first lower punch 21A is arranged such that the position thereof before the compression-forming step is varied with the servomotor 24A for driving the first lower punch 21A based on the mass of the arcuate preformed body 81A, which has been measured with the mass measuring means 26A, to vary the volume of the pair of arcuate cavities 20A.

(Flow of the Production of Arcuate Magnet)

The device 1A for producing a pair of arcuate magnets in the present embodiment produces a pair of arcuate magnets 83A from the above-described compound 80 in the following flow (see the drawings).

Figure 33:
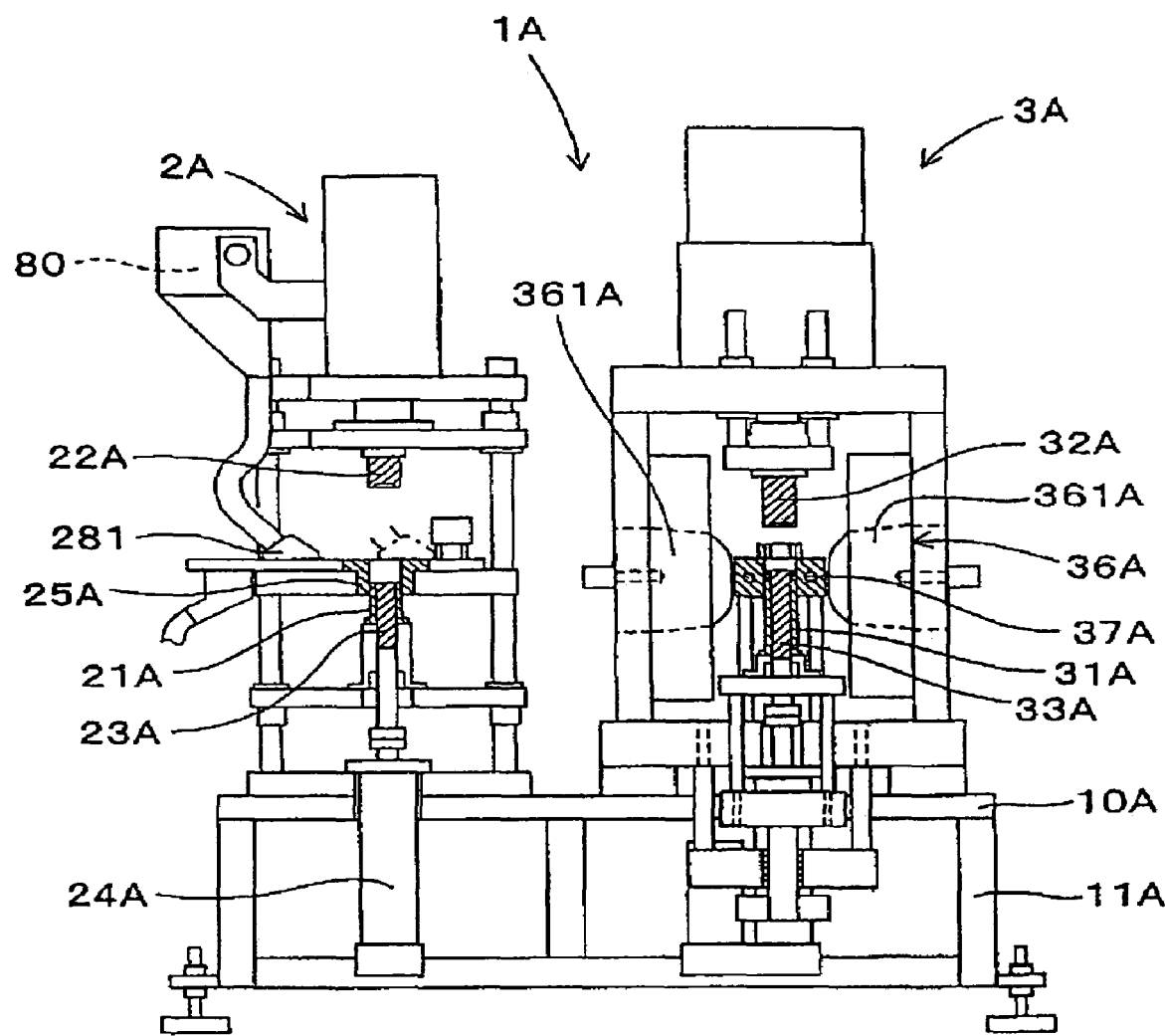
FIG. 33 is a diagram showing an embodiment 2 of a device for producing an arcuate magnet, which is seen from a front thereof.
Figure 34:
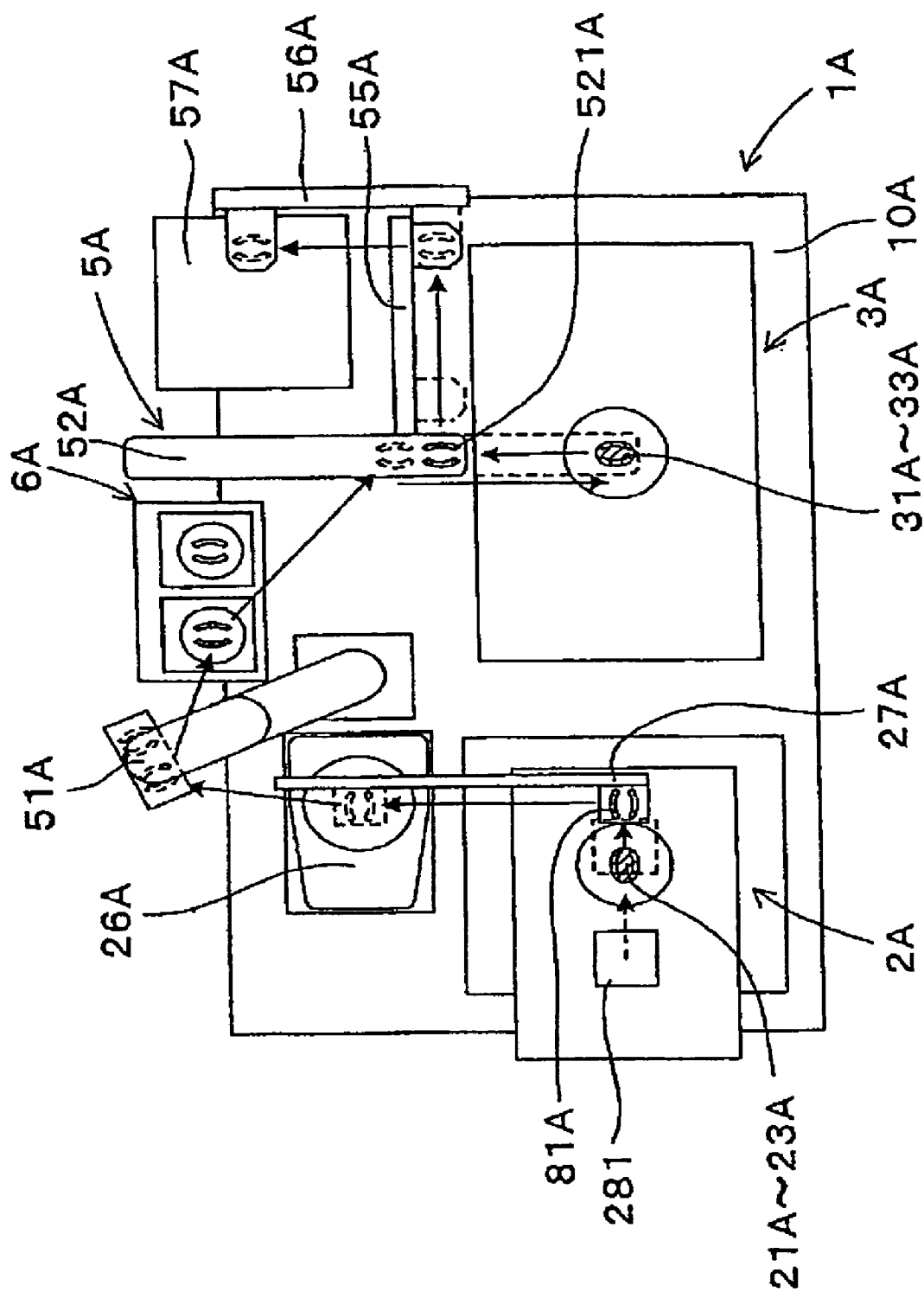
FIG. 34 is a plan view showing the embodiment 2 of a device for producing an arcuate magnet.

Namely, first, as shown in FIGS. 33, 34, the arcuate preformed body 81A is formed from the compound 80 in the preforming section 2A, and is transferred to the mass measuring means 26A by means of a transfer unit 27A. Then, the mass of the pair of arcuate preformed bodies 81A is measured with the mass measuring means 26A, and when the measured mass is within the range of favorable mass values, the pair of arcuate preformed bodies 81A are transferred to the lubricant oil impregnating section 6A by means of a transfer robot 51A.

Next, as shown in FIG. 34, in the lubricant oil impregnating section 6A, impregnation of a lubricant oil 65 is performed on each arcuate preformed body 81A, and then, this arcuate preformed body 81A is transferred to the loader 52A for the magnetic field orienting and forming section by means of the transfer robot 51A.

Figure 35:
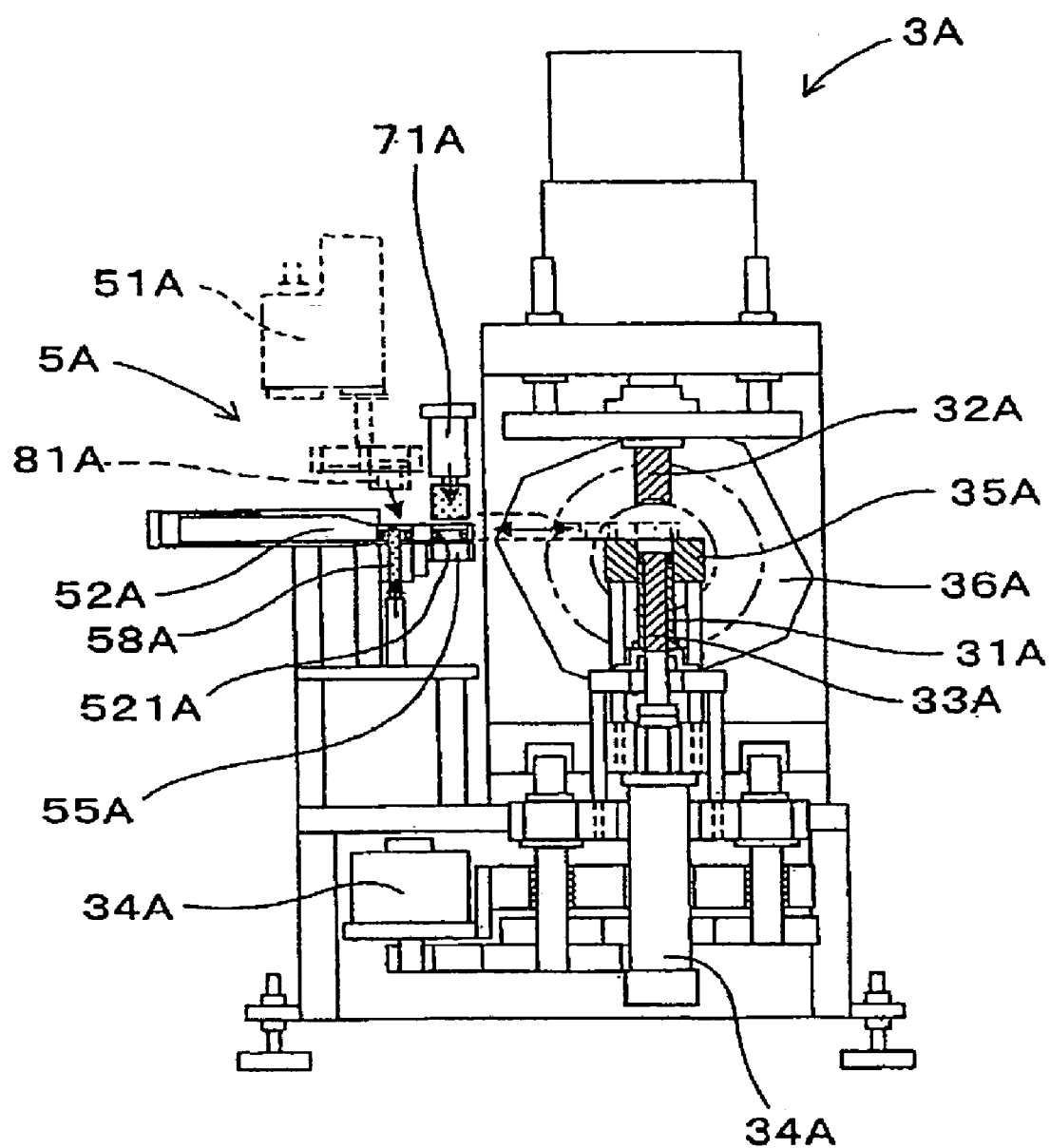
FIG. 35 is a diagram showing a magnetic field orienting and forming section and work transferring section of the embodiment 2, which is seen from side thereof.

Next, as shown in FIG. 35, each arcuate preformed body 81A which has been impregnated with the lubricant oil 65 is transferred to the magnetic field orienting and forming section 3A by means of the loader 52A for the magnetic field orienting and forming section. And in the magnetic field orienting and forming section 3A, magnetic field orienting and forming are performed on each arcuate preformed body 81A to form a pair of arcuate magnets 83A. Then, the pair of arcuate magnets 83A are carried out to a first shuttle 55A by means of the loader 52A for the magnetic field orienting and forming section.

Next, as shown in FIG. 34, each arcuate magnet 83A is transferred to a demagnetizing section 57A by means of the first shuttle 55A and a second shuttle 56A, and in this demagnetizing section 57A, each arcuate magnet 83A is demagnetized (removal of residual magnetization) and powder is removed. Then, each arcuate magnet 83A is magnetized to N pole and S pole in an outside of the device 1A, thereby obtaining the arcuate magnet 83A having a magnetic force.

Hereinafter, the arrangement of the device 1A for producing arcuate magnets in the present embodiment will be explained in detail.

Figure 36:
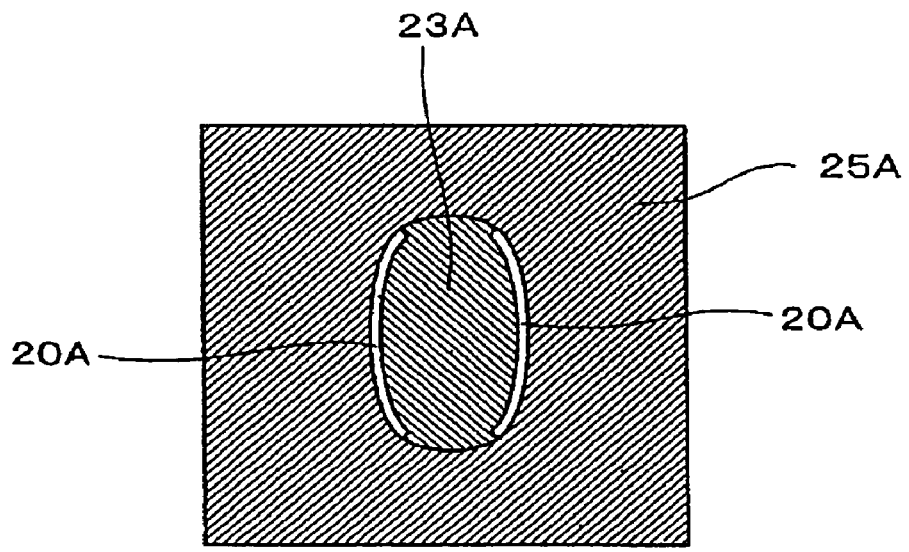
FIG. 36 is a plan view of a pair of arcuate cavities formed in the preforming section of the embodiment 2.

The pair of arcuate magnets 83A to be produced in the present embodiment respectively have a roof tile-shaped configuration. And, as shown in FIG. 36, the pair of arcuate cavities 20A in the preforming section 2A define two spaces, each having a roof tile-shaped configuration, so as to face each other with respect to an axial center of the first core 23A. And the pair of arcuate cavities 20A are formed such that inner peripheries of the spaces, each having the roof tile-shaped configuration, face each other.

And, the first core 23A is so arranged as to define the inner peripheral parts of the arcuate cavities 20A, and define a pair of circumferential ends of the arcuate cavities 20A. And the first lower punch 21A and the first upper punch 22A are arranged to have configurations like a pair of roof tiles, each protruding in facing directions, and define bottom parts (axial end parts) of the arcuate cavities 20A. And the first die 25A is arranged to define an outer peripheral part of each arcuate cavity 20A in a part of the inner peripheral surface thereof, and to slide on the first core 23A in a remaining part of the inner peripheral surface thereof And, the transfer unit 27A of the present embodiment attracts the pair of arcuate preformed bodies 81A with a magnetic force, and transfers the same from the preforming section 2A to the mass measuring means 26A.

Figure 37:
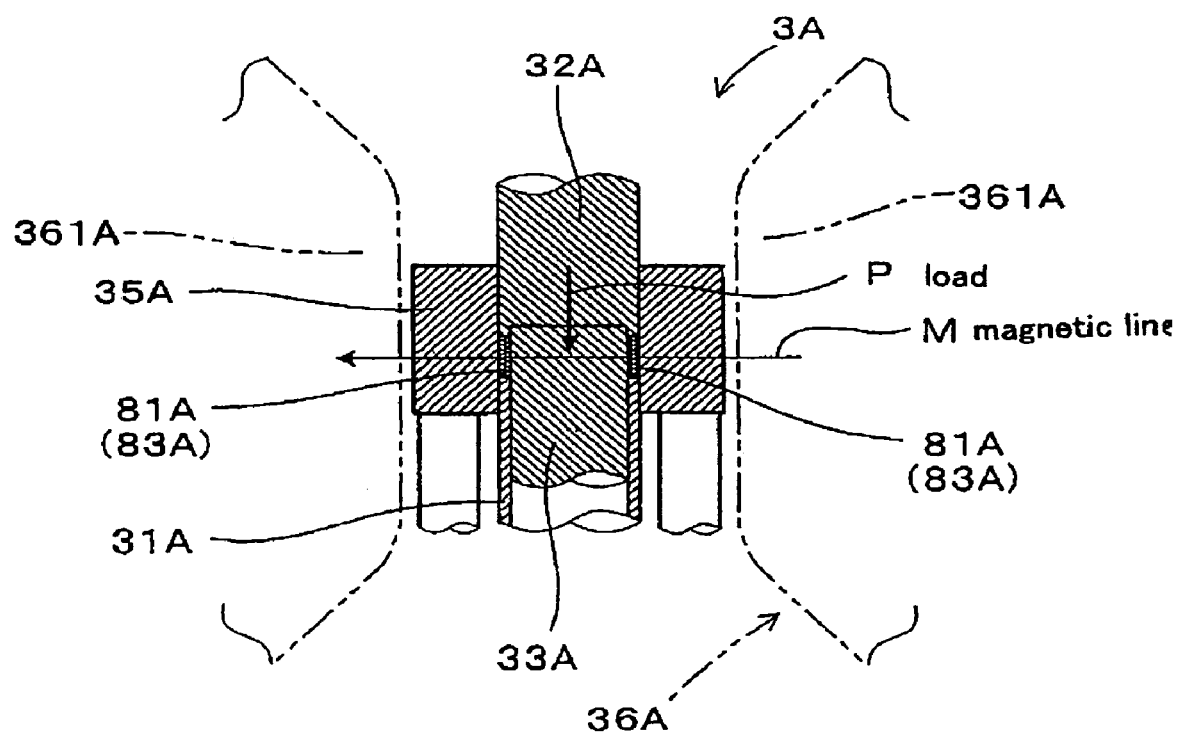
FIG. 37 is a diagram showing the state where a pair of arcuate magnets are formed by applying a magnetic field with magnetic field applying means of the magnetic field orienting and forming section of the embodiment 2, and pressure-forming with a second upper punch and a second lower punch.
Figure 38:
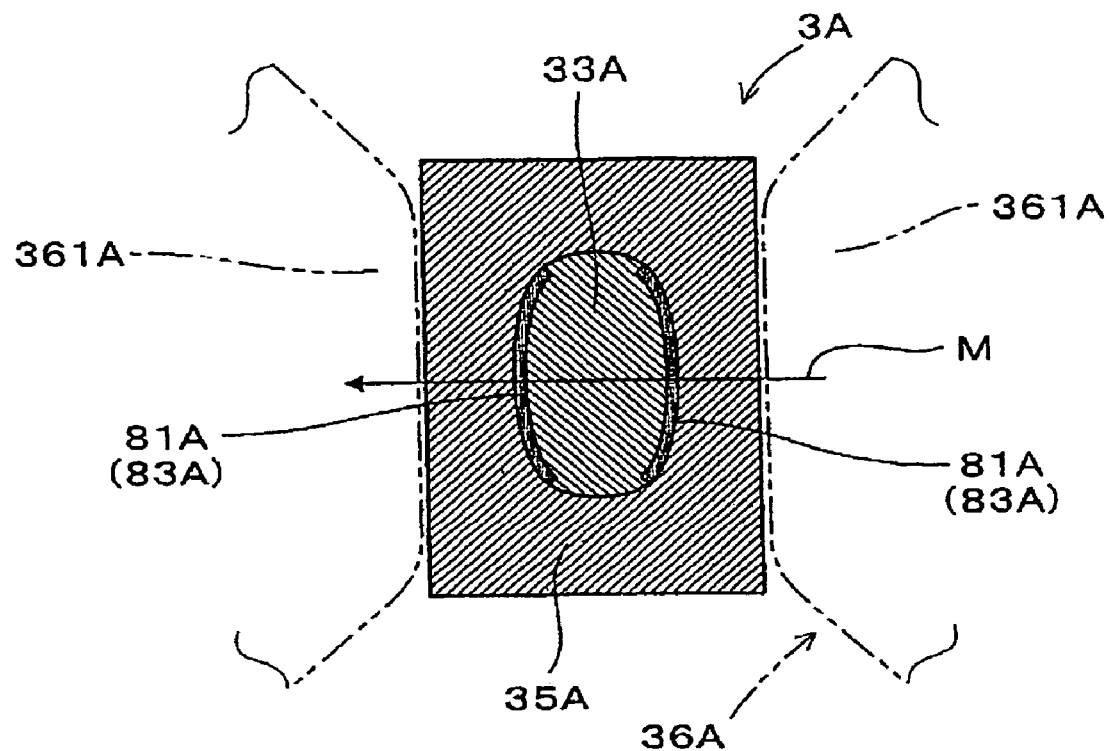
FIG. 38 is a plan view showing the state where the magnetic field is applied with the magnetic field applying means of the magnetic field orienting and forming section of the embodiment 2.

As shown in FIGS. 37, 38, the magnetic field applying means 36A in the magnetic field orienting and forming section 3A is composed of a pair of magnetic field coils 361A, which are disposed so as to catch the second die 35A on both sides thereof. And, by applying a magnetic field from one magnetic field coil 361A to the other magnetic field coil 361A, a magnetic field is applied in a direction of the thickness of each arcuate preformed body 81A, thereby performing orientation of the axial magnetic field. And consequently, the magnetization facilitating axis (the direction in which magnetization is facilitated) of each anisotropic magnet powder in each arcuate preformed body 81A is arranged in a direction of the thickness thereof (circumferential direction).

And, the work transferring section 5A of the present embodiment is arranged such that works composed of a pair of arcuate preformed body 81A or a pair of arcuate magnets 83A are transferred from the mass measuring means 26A to the lubricant oil impregnating section 6A, from the lubricant oil impregnating section 6A to the magnetic field orienting and forming section 3A, and from the magnetic field orienting and forming section 3A to the demagnetizing section 57A.

And the work transferring section 5A of the present embodiment is composed of a transfer robot 51A, a loader 52A for the magnetic field orienting and forming section, a first shuttle 55A and a second shuttle 56A.

As shown in FIGS. 34, 35, the loader 52A for the magnetic field orienting and forming section receives a pair of arcuate preformed bodies 81A from the transfer robot 51A, carries the same in the magnetic field orienting and forming section 3A, receives a pair of arcuate magnets 83A which have been formed from the magnetic field orienting and forming section 3A, and carries the same out to the demagnetizing section 57A. And the loader 52A for the magnetic field orienting and forming section has two holding parts 521A, each being capable of holding the pair of arcuate preformed bodies 81A, and is so arranged as to carry the pair of arcuate preformed bodies 81A held in one of the holding parts 521A in the magnetic field orienting and forming section 3A, hold the pair of arcuate magnets 83A after formed in the other holding part 521A and carry the same out of the magnetic field orienting and forming section 3A.

And, the first shuttle 55A is so arranged as to receive a pair of arcuate magnets 83A from the loader 52A for the magnetic field orienting and forming section, and transfer the same to the second shuttle 56A. And, the second shuttle 56A is so arranged as to transfer the pair of arcuate magnets 83A received from the first shuttle 55A to the demagnetizing section 57A, and unloads the arcuate magnets 83 which have been demagnetized and from which powder is removed in the demagnetizing section 57A from the device 1A.

The work transferring section 5A of the present embodiment has preheating means 58A which preheats the pair of arcuate preformed bodies 81A before transferring the same to the magnetic field orienting and forming section 3A. This preheating means 58A is so arranged as to preheat each arcuate preformed body 81A held in one of the holding parts 521A of the loader 52A for the magnetic field orienting and forming section. And by means of the preheating means 58A, each arcuate preformed body 81A can be previously heated before transferring the same in the magnetic field orienting and forming section 3A, and accordingly, orienting of the magnetic field and pressure-forming can be speedily started in the magnetic field orienting and forming section 3A. And, the preheating means 58A of the present embodiment performs the heating operation using fluid (oil pressure in the present embodiment). The heating means 37A in the magnetic field orienting and forming section 3A also performs the heating operation using fluid (oil pressure in the present embodiment).

In the device 1A of the present embodiment, the magnetic field orienting and forming section 3A also has the function of the main forming section 4 of the embodiment 1. In the magnetic field orienting and forming section 3A, both the orientation of the magnetic field and the main forming are performed, thereby forming the arcuate magnets 83A to have prescribed dimensions. Accordingly, the main forming section 4 can be omitted, and the cost of the device 1A for producing the arcuate magnets can be decreased and the construction thereof can be made compact.

Figure 39:
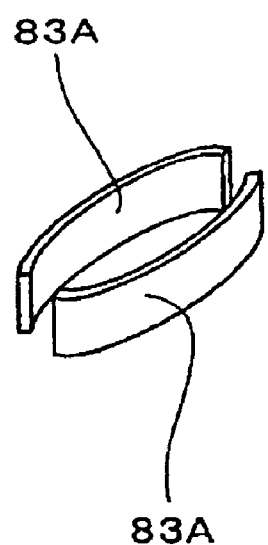
FIG. 39 is a perspective view of the pair of arcuate magnets, which were produced with the embodiment 2 of the device for producing the arcuate magnet.

And, as shown in FIG. 39, with the device 1A of the present embodiment, a pair of arcuate magnets 83A can be produced instead of the annular magnet 83. After magnetizing the arcuate magnets 83A to N pole and S pole, they can be used by disposing the same so as to face a stator of a DC motor.

In addition, the arrangement and operation of each of the preforming section 2A, magnetic field orienting and forming section 3A, or the like of the present embodiment, are similar to those of the embodiment 1. Each section in the device 1A of the present embodiment is designated by adding A to the reference character used in the embodiment 1.

With the device of the embodiment 1, the annular magnet 83 was produced, whereas with the device of the embodiment 2, the pair of arcuate magnets 83A were produced. Alternatively, with the device of the embodiment 1, the pair of arcuate magnets 83A can be produced, whereas with the device of the embodiment 2, the annular magnet 83 can be produced. In addition, when required, the arcuate magnet 83A may be composed of four pieces.

The remaining constructions of these modified embodiments are similar to those of embodiment 1, and accordingly, operational advantages similar to those of the embodiment 1 can be effected.

What is claimed is:

1. A device for producing one of an annular magnet and an arcuate magnet, comprising:
a preforming section which includes
a first die defining an outer peripheral part of one of an annular cavity and a plurality of arcuate cavities, each facing each other,
a first core defining an inner peripheral part of one of said annular cavity and said plurality of arcuate cavities,
a first lower punch defining a bottom of one of said annular cavity and said plurality of arcuate cavities,
a first upper punch facing said first lower punch, and
a rubbing jig which moves on said first die, one of said annular cavity and said plurality of arcuate cavities being charged with a compound as a mixture of an anisotropic magnet powder and a thermosetting resin in an amount which is in accordance with a volume of one of said annular cavity and said plurality of arcuate cavities by moving said rubbing jig, said compound being pressure-formed in one of said annular cavity and said plurality of arcuate cavities with said first upper punch and said first lower punch, thereby obtaining a preformed body;

a magnetic field orienting and forming section for obtaining an intermediate formed body, which includes a second die for holding an outer peripheral surface of said preformed body, a second core for holding an inner peripheral surface of said preformed body, a second lower punch for holding a bottom of said preformed body, a second upper punch for facing said second lower punch, magnetic field applying means for applying a magnetic field to said preformed body, and heating means for heating said preformed body, a main forming section for obtaining one of an annular magnet and a plurality of arcuate magnets, which includes a third die for holding an outer peripheral surface of said intermediate formed body, a third core for holding an inner peripheral surface of said intermediate formed body, a third lower punch for holding a bottom of said intermediate formed body, a third upper punch for facing said third lower punch, and heating means for heating said intermediate formed body, and a work transferring section which holds said preformed body, and transfers said preformed body from said preforming section to said magnetic field orienting and forming section, and which also holds said intermediate formed body, and transfers said intermediate formed body from said magnetic field orienting and forming section to said main forming section, servomotors which drive said first through third upper punches, said first through third lower punches and said first through third cores respectively, a mass measuring means for measuring the mass of said preformed body after forming of said preformed body, and a control means which varies the position of said lower punch before pressure-forming with said servomotor, based on said mass of said preformed body, which has been measured with said mass measuring means, and varies a volume of one of said cavity and said cavities, thereby varying a charged amount of said compound.

2. A device for producing one of an annular magnet and an arcuate magnet as claimed in claim 1, wherein said work transferring section includes a cassette for said magnetic field orienting and forming section, which carries said preformed body in said magnetic field orienting and forming section, and carries said intermediate formed body out of said magnetic field orienting and forming section, a cassette for said main forming section, which carries said intermediate formed body in said main forming section, and carries one of said annular magnet and said plurality of arcuate magnets out of said main forming section, and a loader cassette which receives said intermediate formed body from said cassette for said magnetic field orienting and forming section, and delivers in said cassette for said main forming section.

3. A device for producing one of an annular magnet and an arcuate magnet, as claimed in claim 2, wherein said cassette for said magnetic field orienting and forming section is so arranged as to hold said preformed body which is prior to magnetic field orienting and forming, advance to the position between said second upper punch and said second lower punch, supply said preformed body to said second upper punch, receive said intermediate formed body which is after magnetic field orienting and forming, hold said intermediate formed body, and move back from said position between said second upper punch and said second lower punch.

4. A device for producing one of an annular magnet and an arcuate magnet, as claimed in claim 2, wherein said cassette for said magnetic field orienting and forming section is so arranged as to receive said intermediate formed body when said second lower punch pushes said intermediate formed body to said cassette for said magnetic field orienting and forming section, and supply said preformed body to said second upper punch when said preformed body is pushed out with said intermediate formed body.

5. A device for producing one of an annular magnet and an arcuate magnet, as claimed in claim 2, wherein said cassette for said main forming section is so arranged as to hold said intermediate formed body before main forming, advance to the position between said third upper punch and said third lower punch, supply said intermediate formed body to said third upper punch, receive one of said annular magnet and plurality of arcuate magnets which has been subjected to preceding main forming, hold one of said annular magnet and plurality of arcuate magnets, and move back from the position between said third upper punch and said third lower punch.

6. A device for producing one of an annular magnet and an arcuate magnet, as claimed in claim 2, wherein said cassette for said main forming section is so arranged as to receive one of said annular magnet and plurality of arcuate magnets when said third lower punch pushes one of said annular magnet and plurality of arcuate magnets in said cassette for said main forming section, and supply said intermediate formed body to said third upper punch when said intermediate formed body is pushed out with one of said annular magnet and plurality of arcuate magnets.

7. A device for producing one of an annular magnet and an arcuate magnet, as claimed in claim 1 or 2, wherein said magnetic field orienting and forming section and said main forming section are so arranged as to perform pressure-forming at different timings, thereby restraining generation of a peak electric power due to said servomotor.

8. A device for producing one of an annular magnet and an arcuate magnet as claimed in claim 1 or 2, wherein said main forming section is so arranged as to perform pressure-forming of intermediate formed bodies which are stacked with said third upper punch and said third lower punch.

9. A device for producing one of an annular magnet and an arcuate magnet, comprising:
- a preforming section which includes
  - a first die defining an outer peripheral part of one of an annular cavity and a plurality of arcuate cavities, each facing each other,
  - a first core defining an inner peripheral pad of one of said annular cavity and said plurality of arcuate cavities,
  - a first lower punch defining a bottom of one of said annular cavity and said plurality of arcuate cavities,
  - a first upper punch facing said first lower punch and
  - a rubbing jig which moves on said first die,
  - one of said annular cavity and said plurality of arcuate cavities being charged with a compound as a mixture of an anisotropic magnet powder and a thermosetting resin in an amount which is in accordance with a volume of one of said annular cavity and said plurality of arcuate cavities by moving said rubbing jig, said compound being pressure-formed in one of said annular cavity and said plurality of arcuate cavities with said first upper punch and said first lower punch, thereby obtaining a preformed body;
- a magnetic field orienting and forming section for obtaining one of an annular magnet and a plurality of arcuate magnets, which includes
  - a second die for holding an outer peripheral surface of said preformed body,
  - a second core for holding an inner peripheral surface of said preformed body.
  - a second lower punch for holding a bottom of said preformed body,
  - a second upper punch for facing said second lower punch,
  - magnetic field applying means for applying a magnetic field to said preformed body, and
  - heating means for heating said preformed body, and
- a work transferring section which holds said preformed body, and transfers said preformed body from said preforming section to said magnetic field orienting and forming section,
- servomotors that drive said first and second upper punches, said first and second lower punches and said first and second cores respectively,
- a mass measuring means for measuring the mass of said preformed body after forming of said preformed body, and a control means that varies the position of said lower punch before pressure-forming with said servomotor, based on said mass of said preformed body, which has been measured with said mass measuring means, and varies a volume of one of said cavity and said cavities, thereby in a charged amount of said compound.

10. A device for producing one of an annular magnet and an arcuate magnet, as claimed in claim 1, 2 or 9, wherein said work transferring section further includes preheating means capable of preheating said preformed body upon holding said preformed body.

11. A device for producing one of an annular magnet and an arcuate magnet, as claimed in claim 1, 2 or 9, further comprising a lubricant oil impregnating section for impregnating a lubricant oil in said preformed body,
- said lubricant oil impregnating section including an impregnation jig for placing said preformed body, lubricant oil feeding means for feeding said lubricant oil to said preformed body placed in said impregnation jig, and suction means for sucking said lubricant oil impregnated in said preformed body placed in said impregnation jig, and,
- said work transferring section being so arranged as to hold said preformed body which is before impregnating with said lubricant oil, transfer said preformed body from said preforming section to said lubricant oil impregnating section, hold said preformed body which is after impregnating with said lubricant oil, and transfer said preformed body from said lubricant oil impregnating section to said magnetic field orienting and forming section.

* * * * *